COLLISION AVOIDANCE RADAR TRAINER

Filed Sept. 29, 1967 17 Sheets-Sheet 1

INVENTORS
WILLIAM K. BURCHARD
WILLIAM P. JAMESON
EDWARD F. MAGEE
BY
William Grobman May 26, 1970 W. K. BURCHARD ET AL 3,514,521

COLLISION AVOIDANCE RADAR TRAINER

Filed Sept. 29, 1967 17 Sheets-Sheet 2

COLLISION AVOIDANCE RADAR TRAINER

May 26, 1970 W. K. BURCHARD ET AL 3,514,521

COLLISION AVOIDANCE RADAR TRAINER

Filed Sept. 29, 1967 17 Sheets-Sheet 10

May 26, 1970 W. K. BURCHARD ET AL 3,514,521

COLLISION AVOIDANCE RADAR TRAINER

Filed Sept. 29, 1967 17 Sheets-Sheet 12

May 26, 1970 W. K. BURCHARD ET AL 3,514,521

COLLISION AVOIDANCE RADAR TRAINER

Filed Sept. 29, 1967 17 Sheets-Sheet 15

May 26, 1970 W. K. BURCHARD ET AL 3,514,521

COLLISION AVOIDANCE RADAR TRAINER

Filed Sept. 29, 1967 17 Sheets-Sheet 17

United States Patent Office 3,514,521

Patented May 26, 1970

3,514,521

COLLISION AVOIDANCE RADAR TRAINER

William K. Burchard, Silver Spring, William P. Jameson, Indian Head, and Edward F. Magee, Crofton, Md., assignors to Singer-General Precision, Inc., Binghamton, N.Y., a corporation of Delaware Filed Sept. 29, 1967, Ser. No. 671,801

Int. Cl. G09b *9/06;* G01s *9/00*

U.S. Cl. 35—10.4 12 Claims

ABSTRACT OF THE DISCLOSURE

This invention comprises a simulator of radar, or the like, for training purposes. The trainer utilizes a standard radar display device with all of the power supplies, sweep circuits, and other normal control circuits found in such a radar display. The control of the standard display is achieved by means of a digital computer through specially constructed circuitry to cause the Z axis of the cahtode beam in a PPI sweep to be modulated in a manner which creates, on the face of the CRT, a display of the geographical area desired including moving target ships, buoys, etc. The configuration of a harbor is depicted on the display and the harbor outline moves realistically as the simulated ship moves through a mission. Initial information relating to the simulated ship characteristics such as maximum speed, rudder delays, maximum rate of turn, direction and speed of currents, ship position, buoy position, and the like are inserted into the equipment manually by an operator by means of switches which provide discrete inputs. In addition, the trainee has a simulated ship control by means of which he modifies ship speed and heading and which contains numeral displays of ship speed and heading. The display is readily changed from true to relative bearing. As the mission proceeds, the heading and speed of the ship is utilized by the computer to compute the new positions at which the harbor outline, buoys, target ships, and other radar reflective devices are to be depicted. The devices uses a plurality of computer words to define a single sweep radial. When a target is indicated by a pulse in one bit position, the following bit positions are decoded to provide several possible levels of radar intensity for the indicated spot. When no target is indicated, the bit positions contain no pulses. The computer, together with the interface equipment, constructs the plural word definitions of the individual lines as the mission proceeds, with the information for the sweep being updated periodically. The interface equipment contains the conversion circuits which convert the information from the computer form to that required to control the CRT beam.

Figure 1:
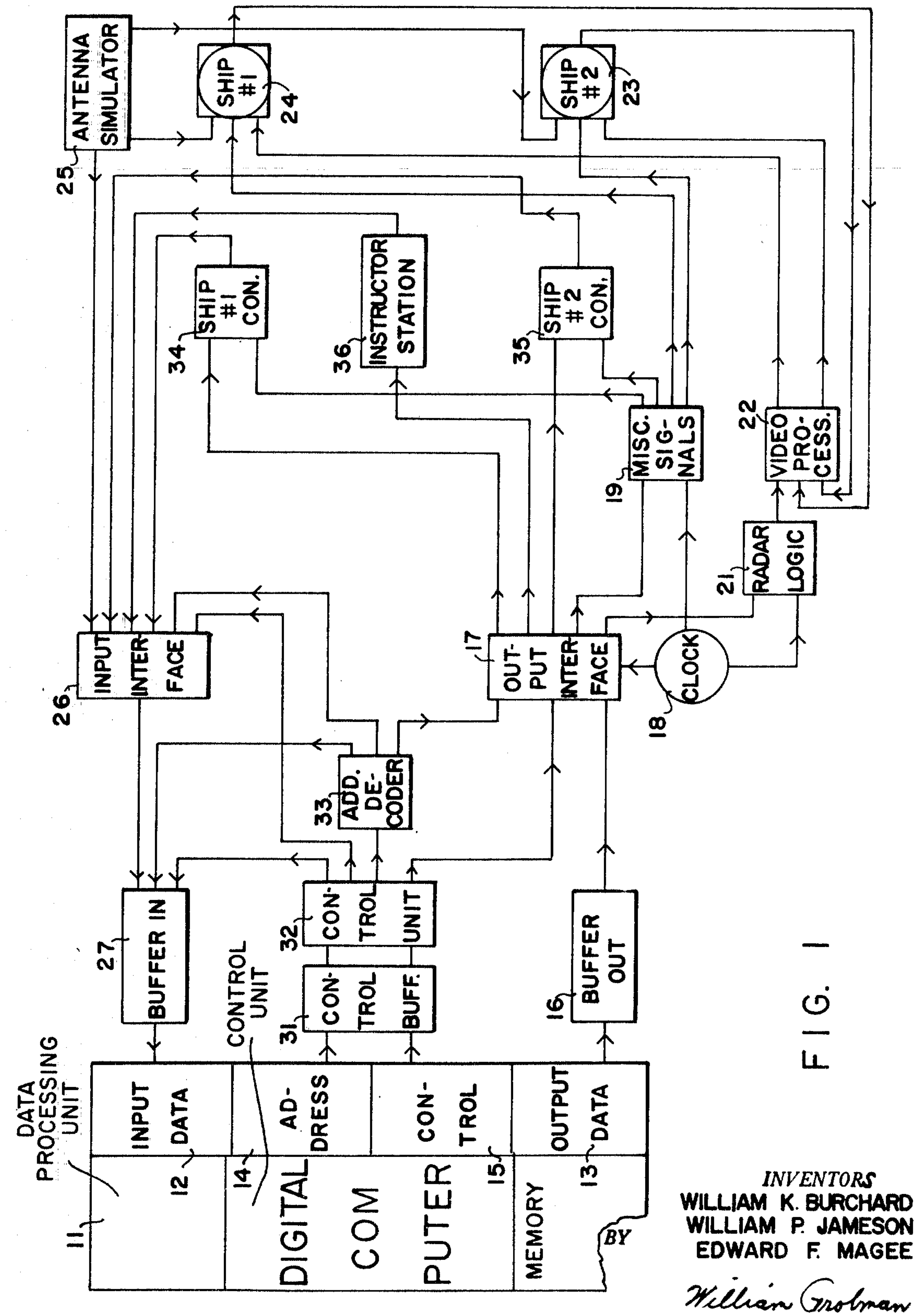

This invention relates to training devices and, more particularly, to devices for electronically controlling electrical display devices to realistically duplicate operational navigation equipment such as radar.

Expanding maritime and air traffic is resulting in more hazardous conditions and an increasing number of air and marine collisions. In addition to the loss of life and human hardship, property losses have been great. Reasons for such collisions are many and complex, but one of the most important of these is lack of adequate training on the part of the navigator in understanding and using radar and related navigational aids. Training devices for simulating radar displays and the like are not new, but in the past such devices have all suffered from major disadvantages. The primary disadvantage of such older training devices is lack of flexibility. Then, there is the added disadvantage of the older devices of not being amenable to changes in either their types of display or their capabilities without major structural modification. The operation of prior art equipment to simullate real world activites is usually limited to previously prepared film. Where the film is prepared to provide detail and variation, it is very expensive to initially prepare and expensive to change. Where less expensive prepared films are used, the amount and type of simulation is limited and is poor. In any case, changes to the film are usually difficult and expensive to make. When the simulation exercise is to be changed, the prior art devices usually require expensive and largescale structural modifications.

It has been apparent for some time that the most suitable training for persons who must react quickly and accurately in time of emergency is training under emergency conditions. Since it is not practical to provide emergency training in operational equipment, particularly not in vehicles, stationary simulators have been used for such training for many years. The trainer of this invention is such a device. In order to provide the versatility required in a training device which must simulate operational equipment in all of its operations, the older philosophy of analog devices was discarded in flavor of the more manipulative digital techniques. At one time it was felt that a system which simulated by creating analogs of the parameters being simulated was the best device which could be used. However, even though analog devices operate rapidly and with high resolution, they are limited in their ability to be changed rapidly to meet changing training situations over a wide range of conditions. For this reason, the use of digital apparatus was developed.

It is an object of this invention to provide a new and improved training apparatus.

It is another object of this invention to provide a new and useful training apparatus which utilizes digital equipment for improved versatility.

It is a further object of this invention to provide new and improved apparatus for simulating radar types of equipment.

It is still another object of this invention to provide new and improved training apparatus which utilizes digital techniques to create a readily controlled simulation of operational equipment.

Figure 2A:
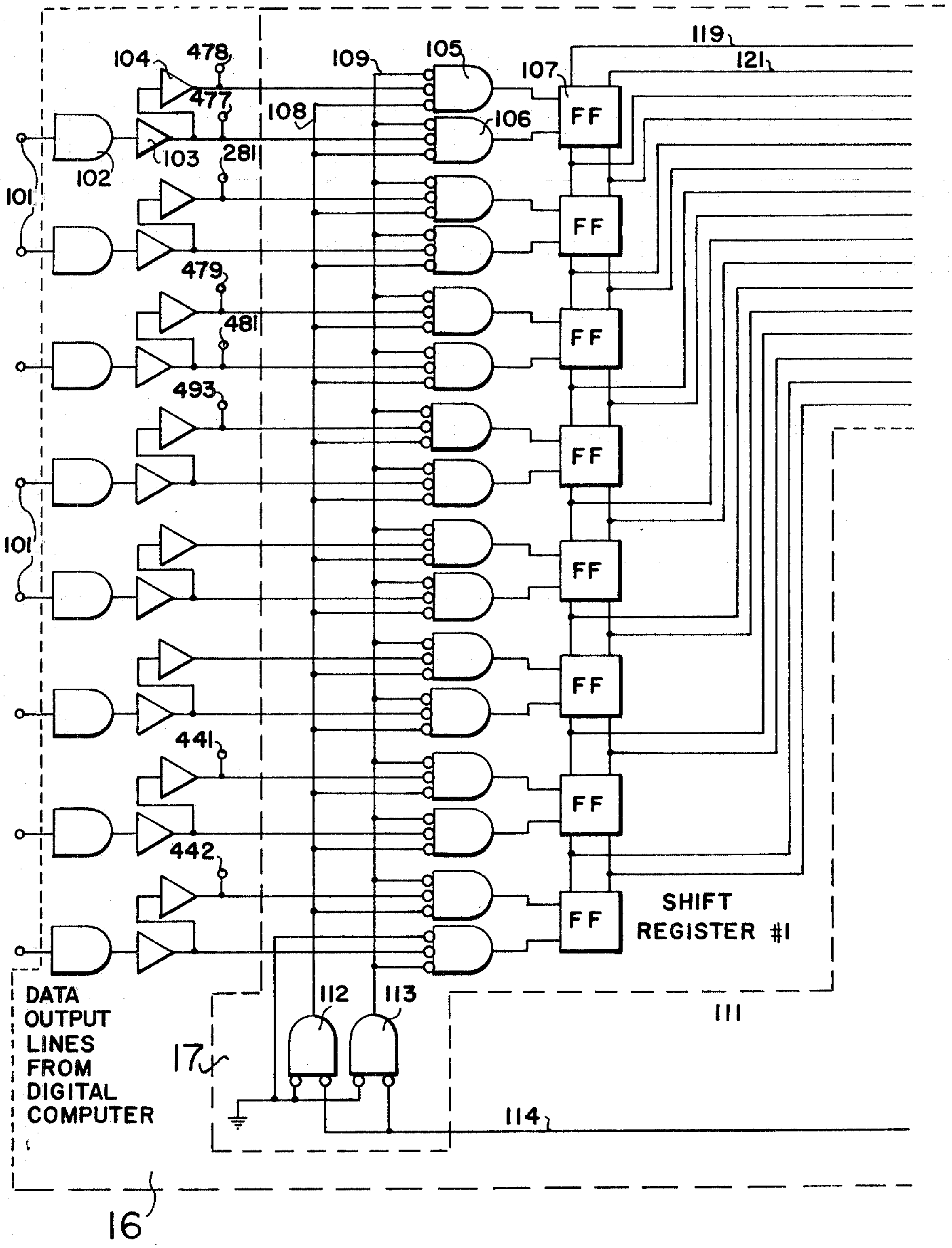
Figure 2B:
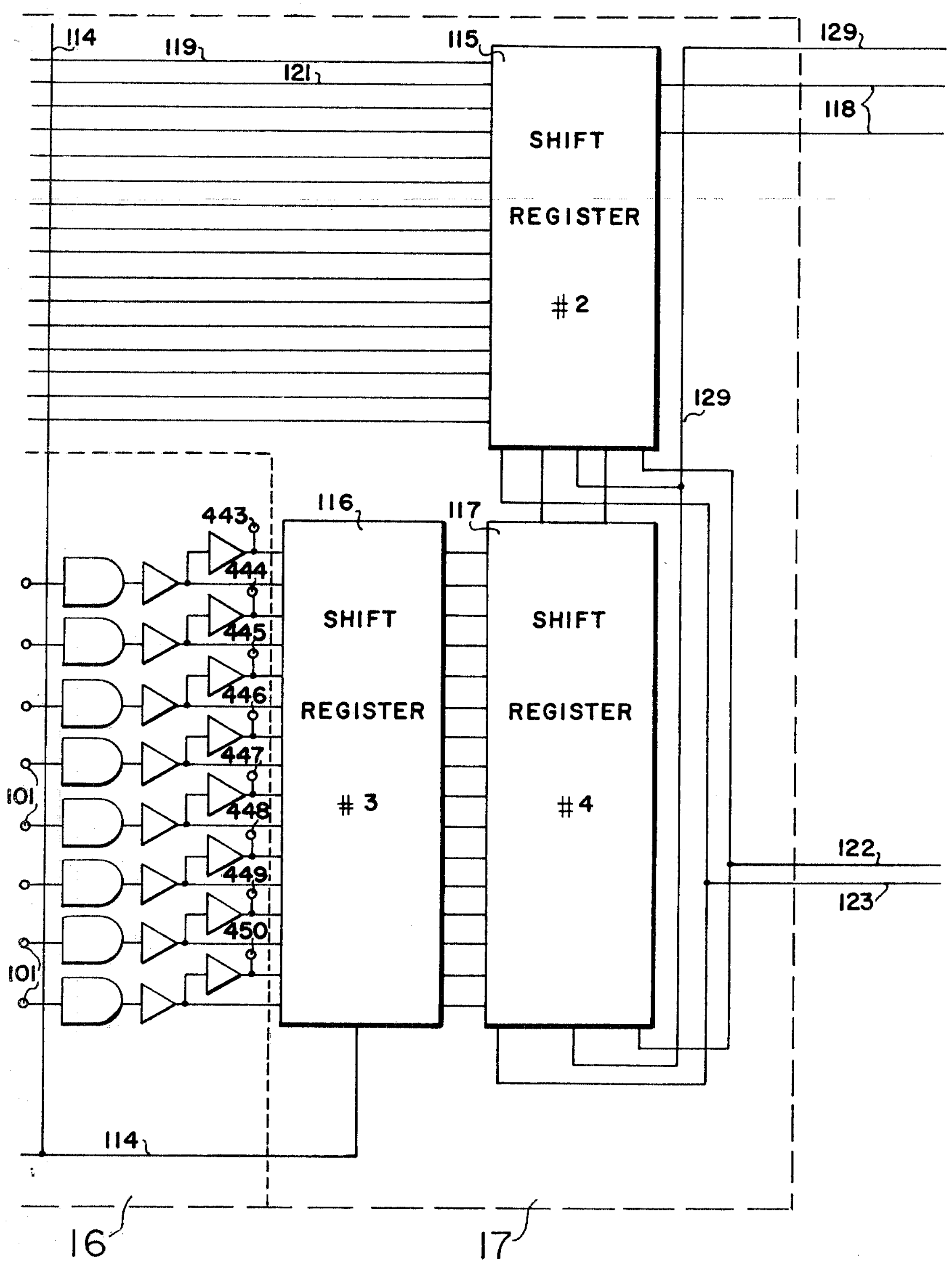
Figure 2C:
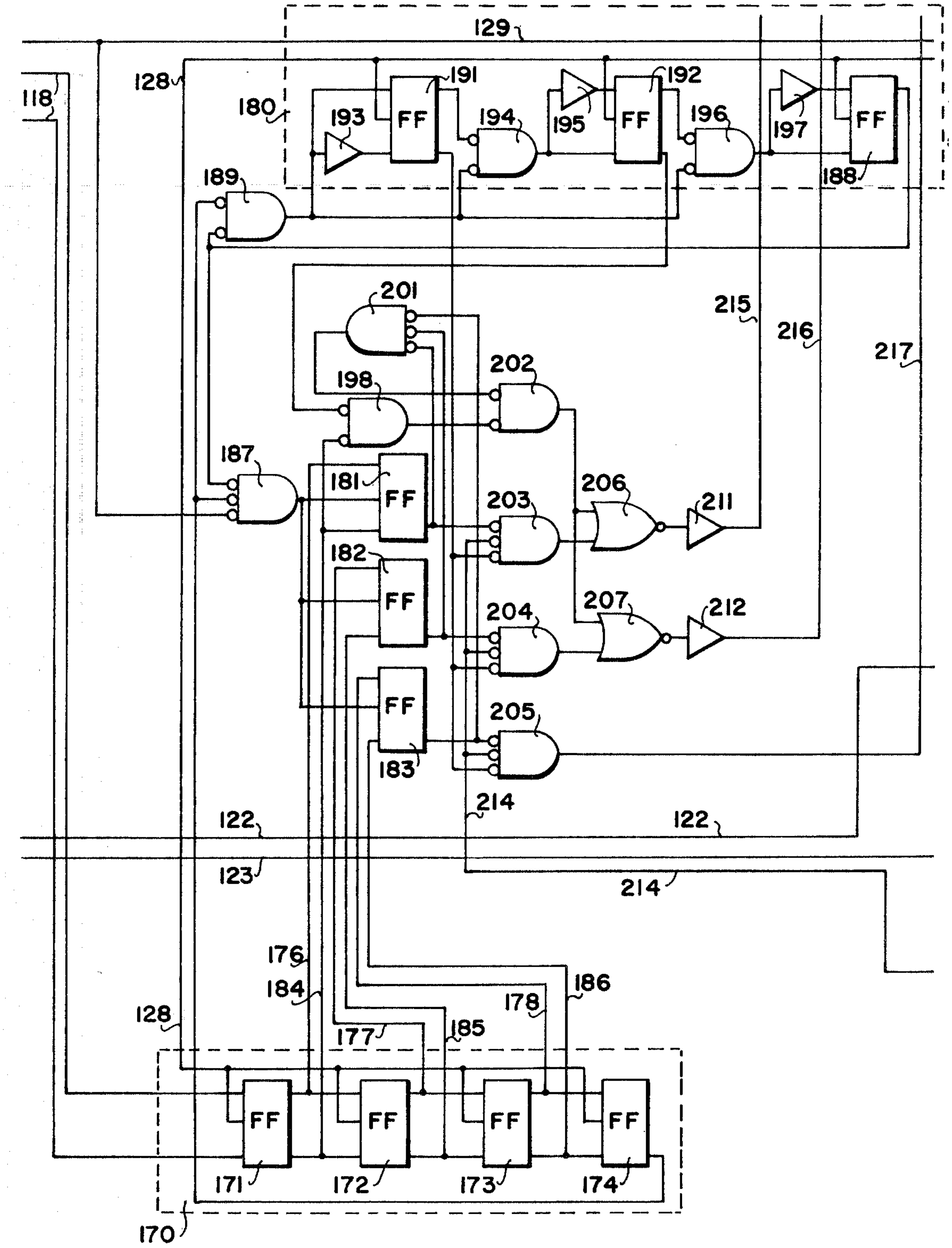
Figure 2D:
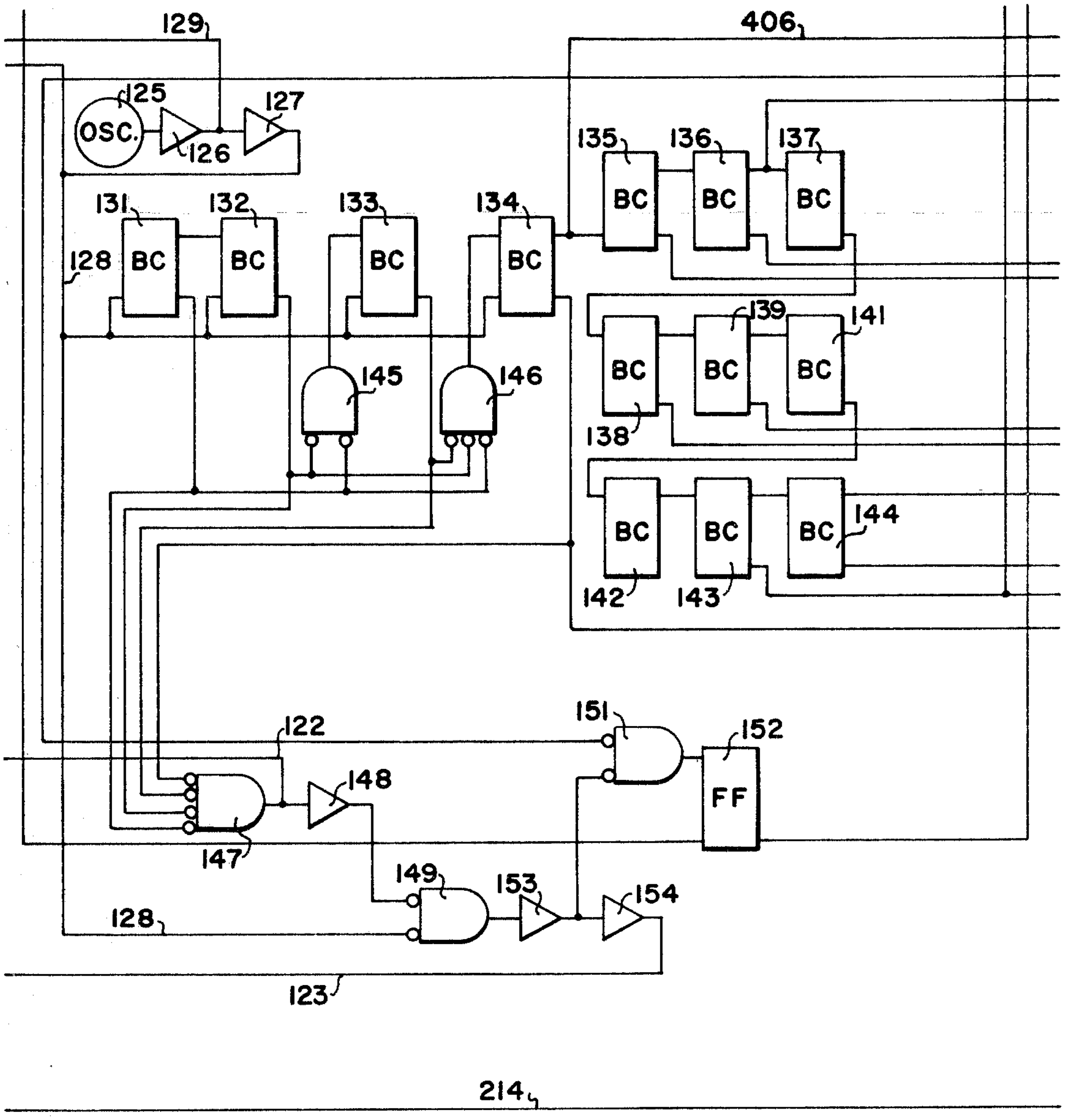
Figure 2E:
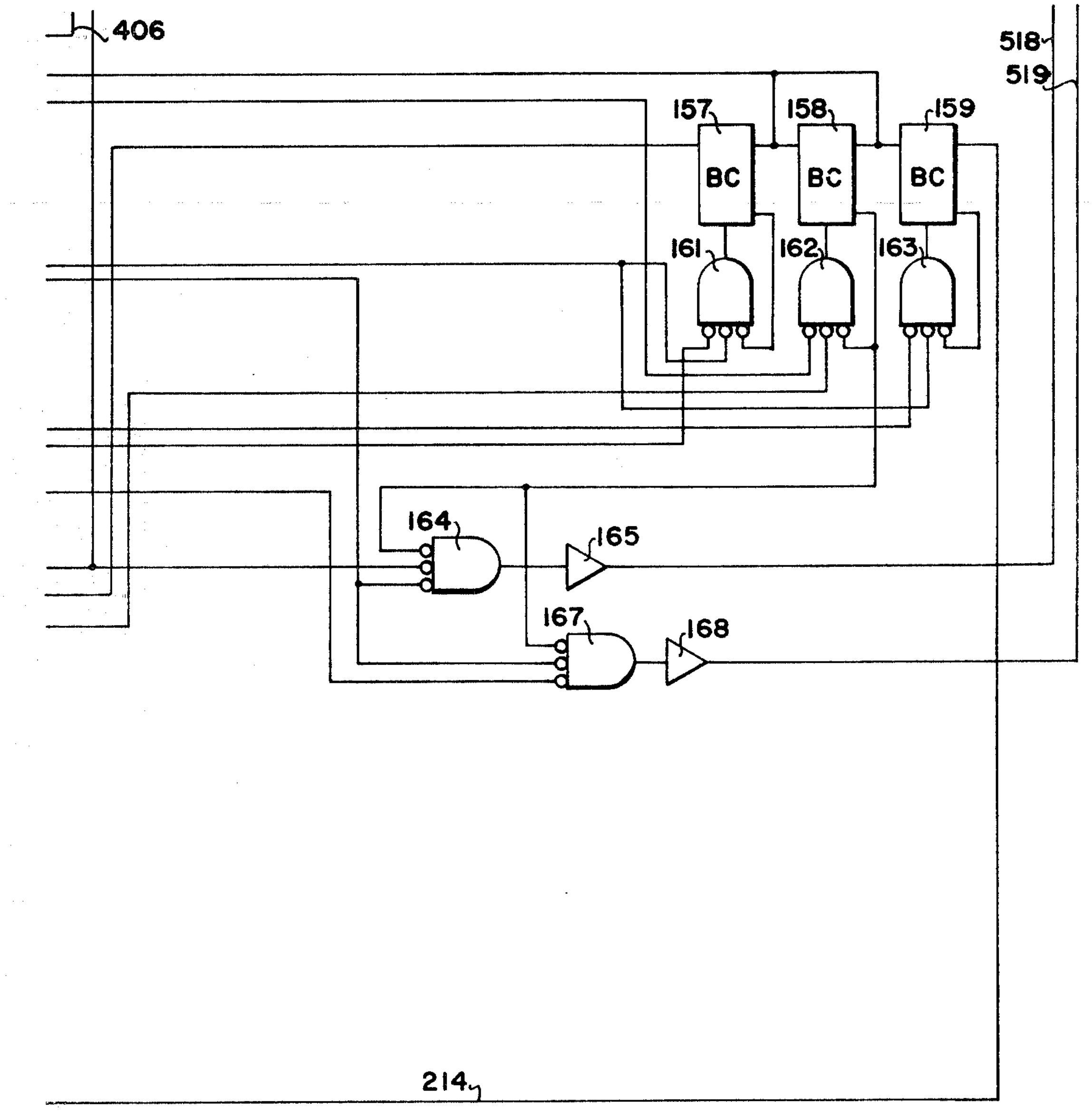
Figure 2F:
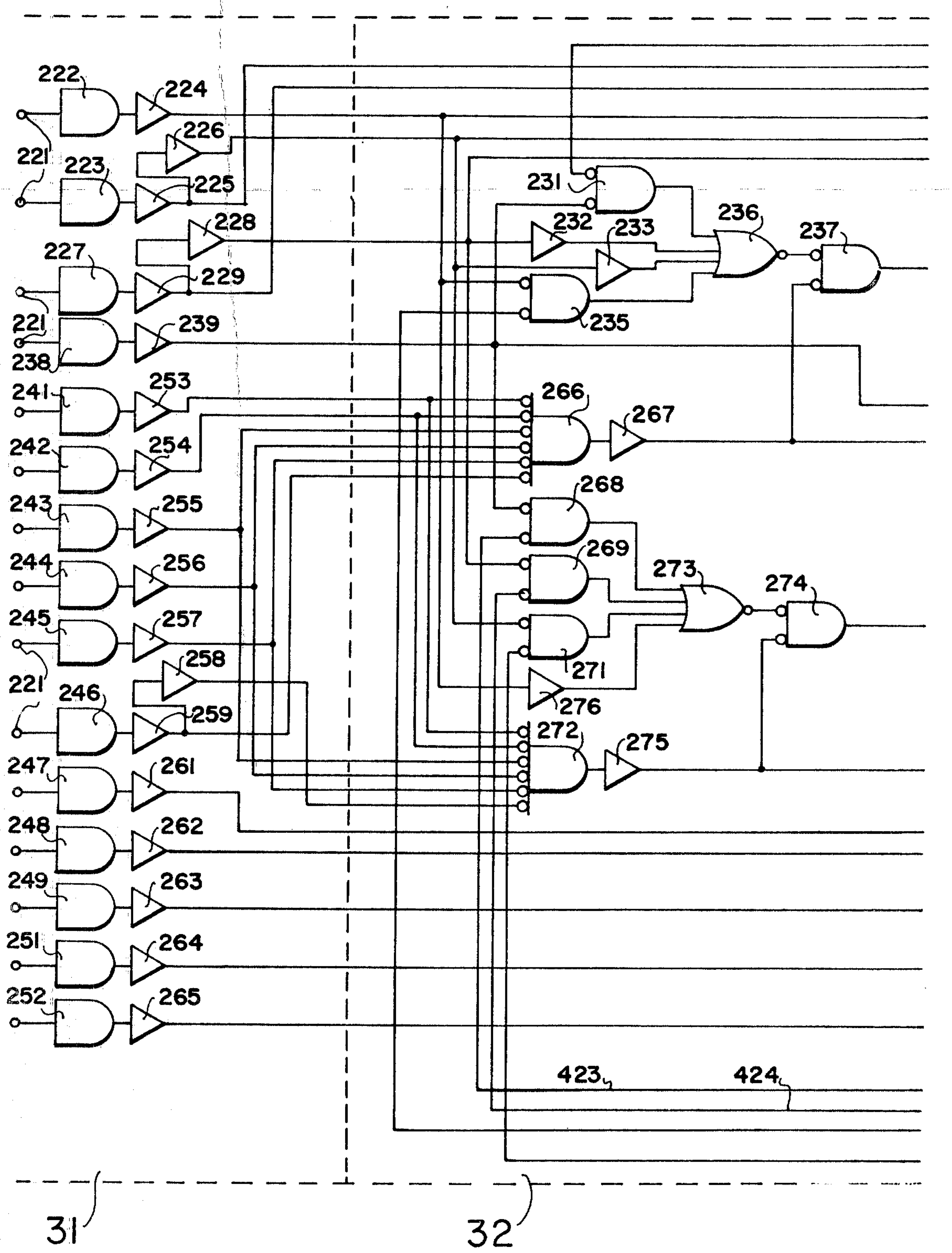
Figure 2G:
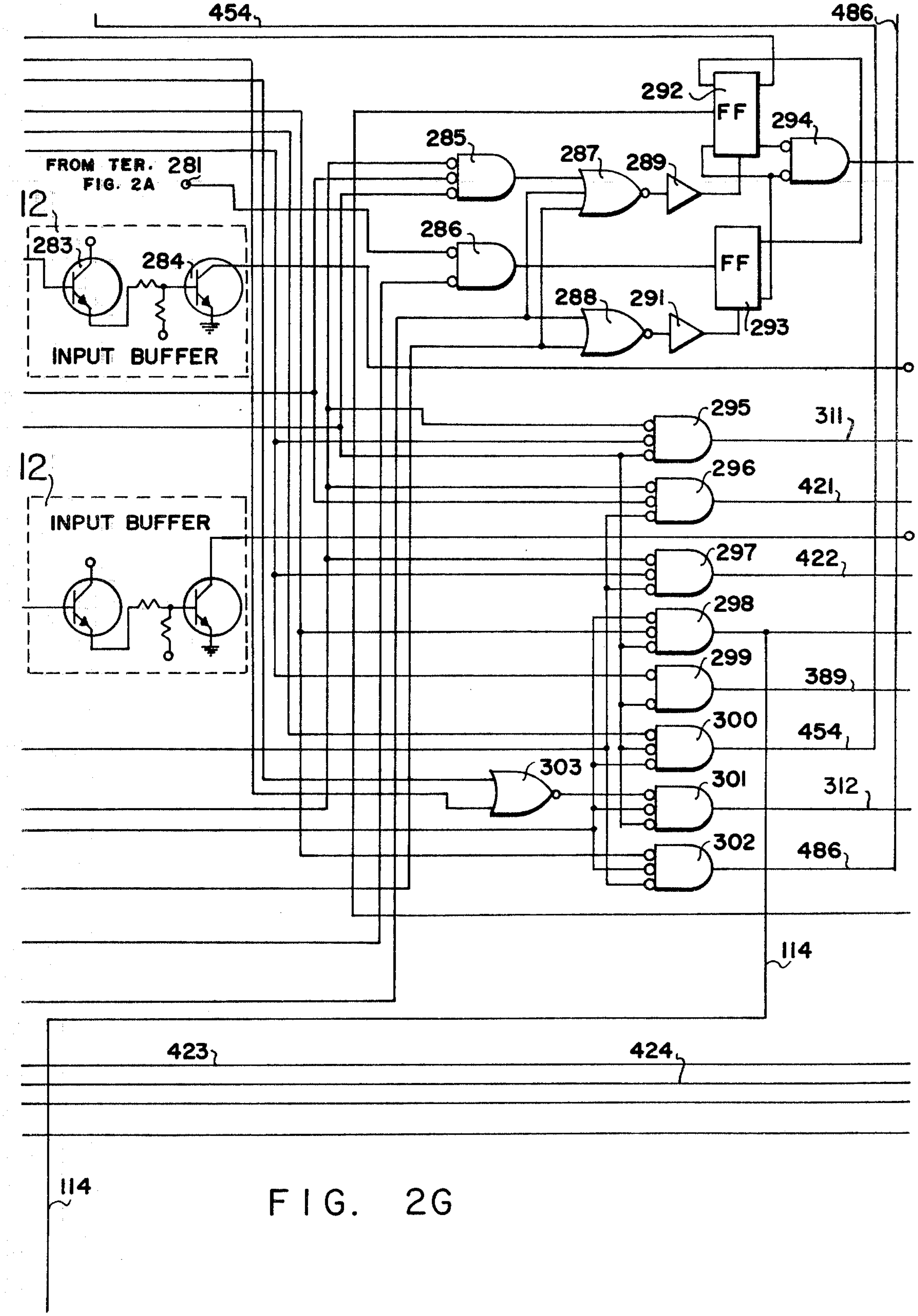
Figure 2H:
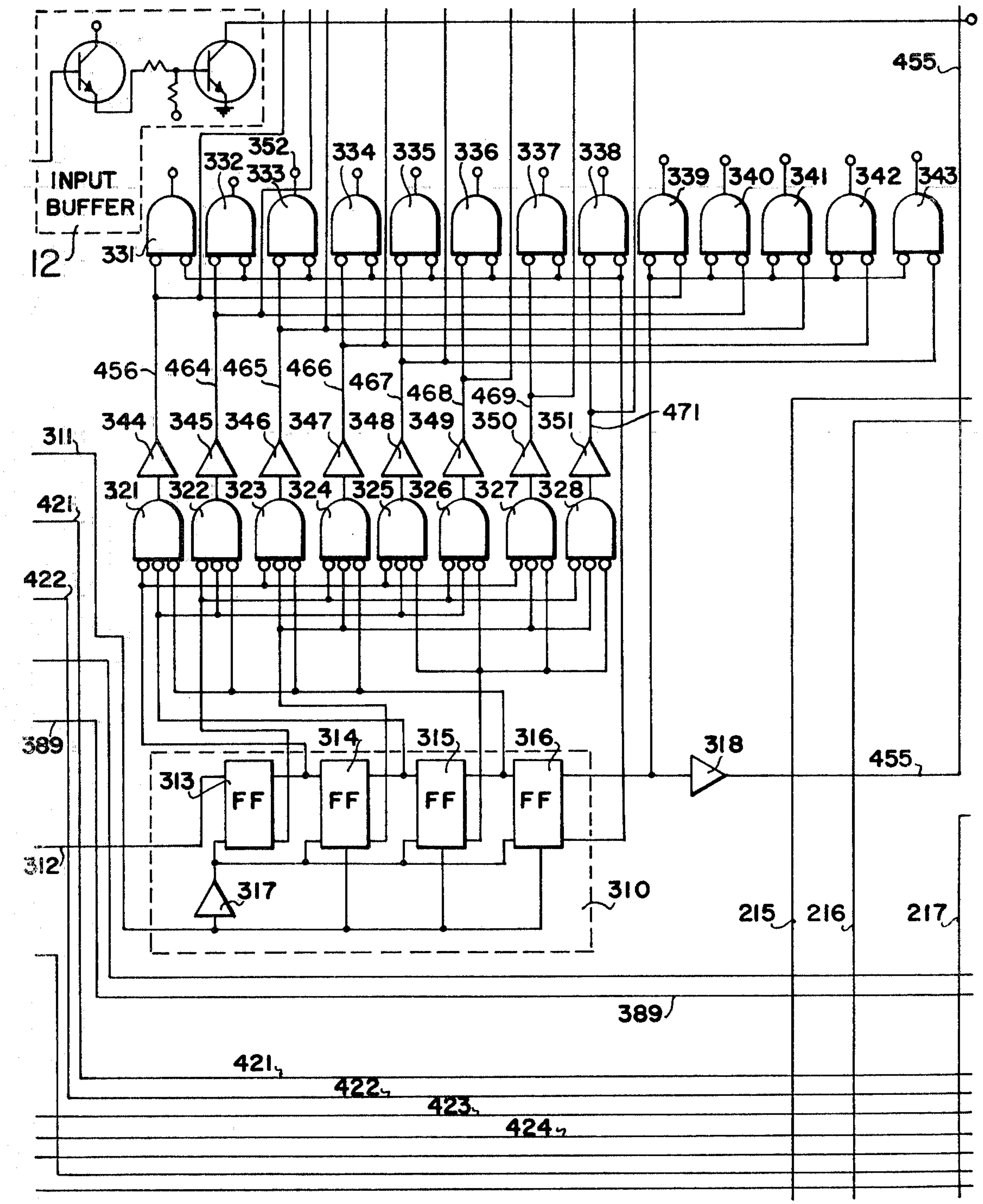
Figure 2I:
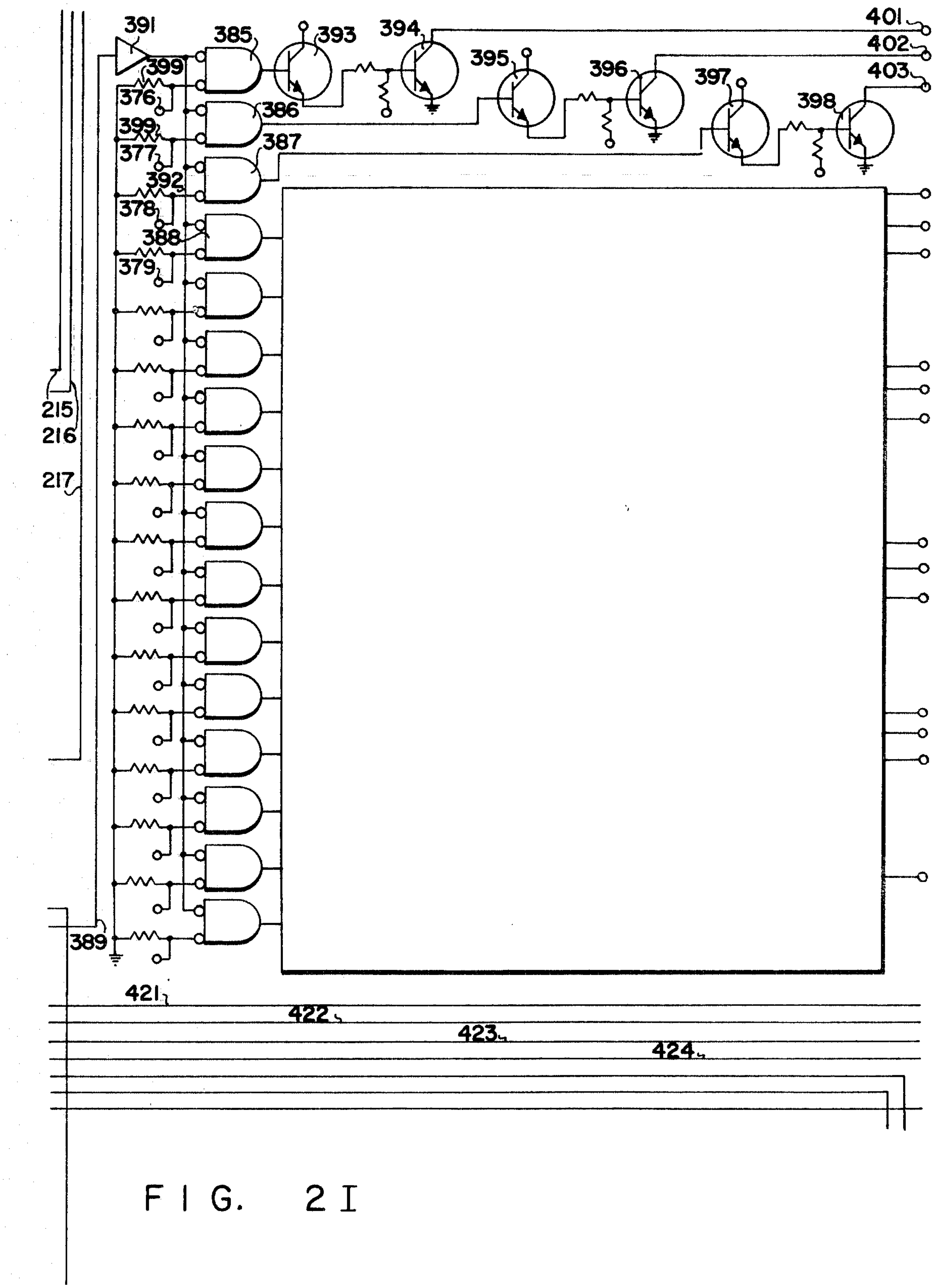
Figure 2J:
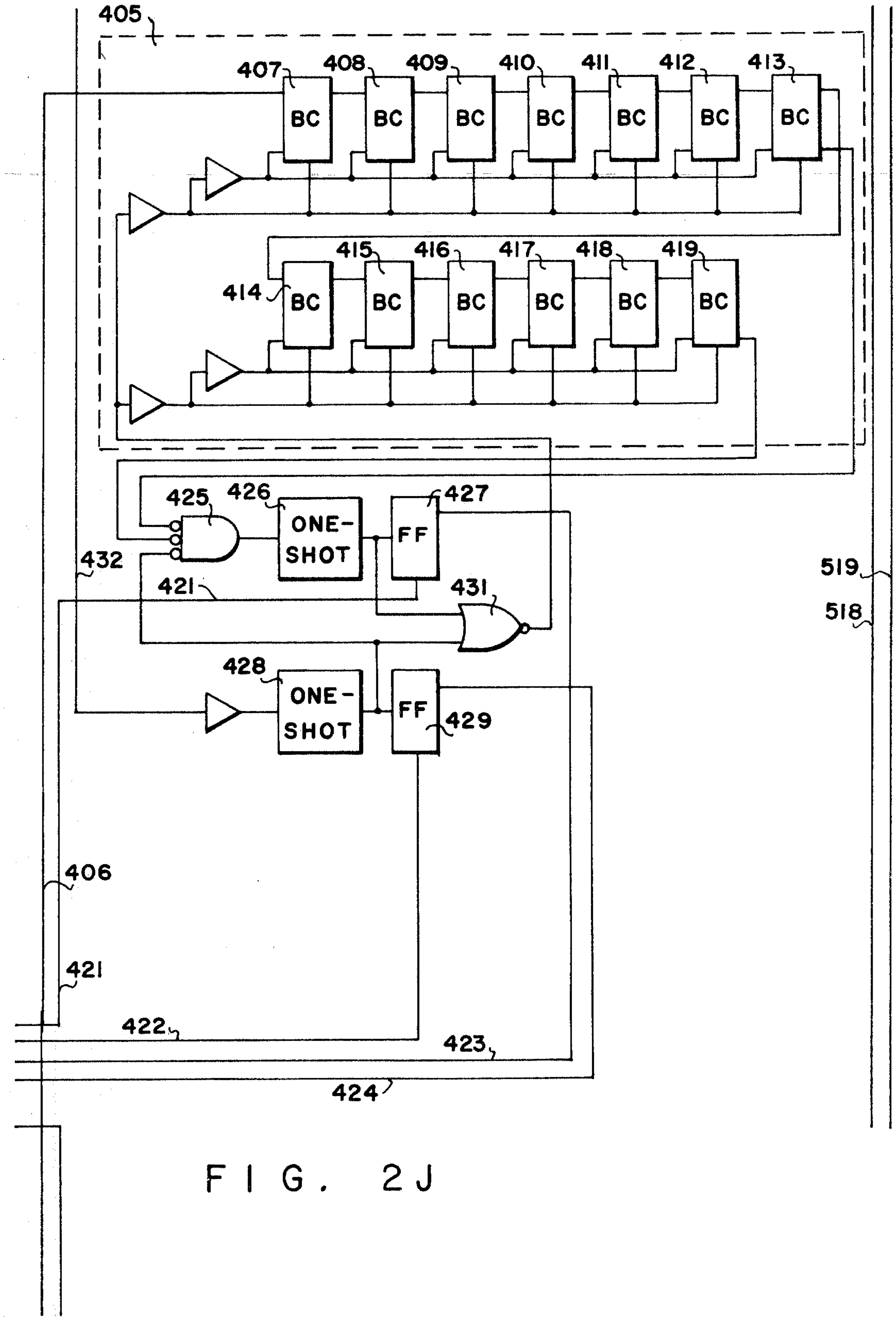
Figure 2K:
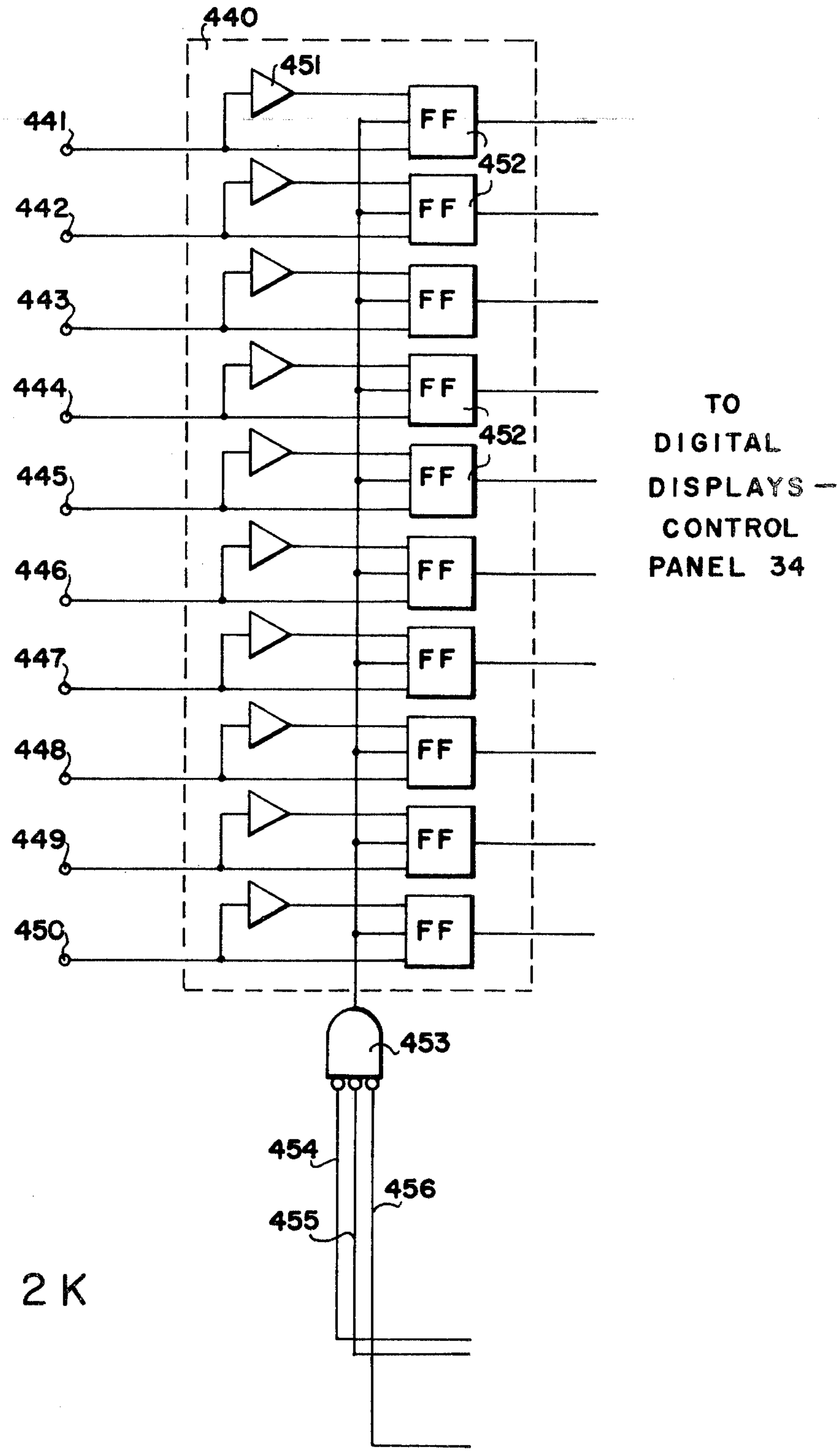
Figure 2L:
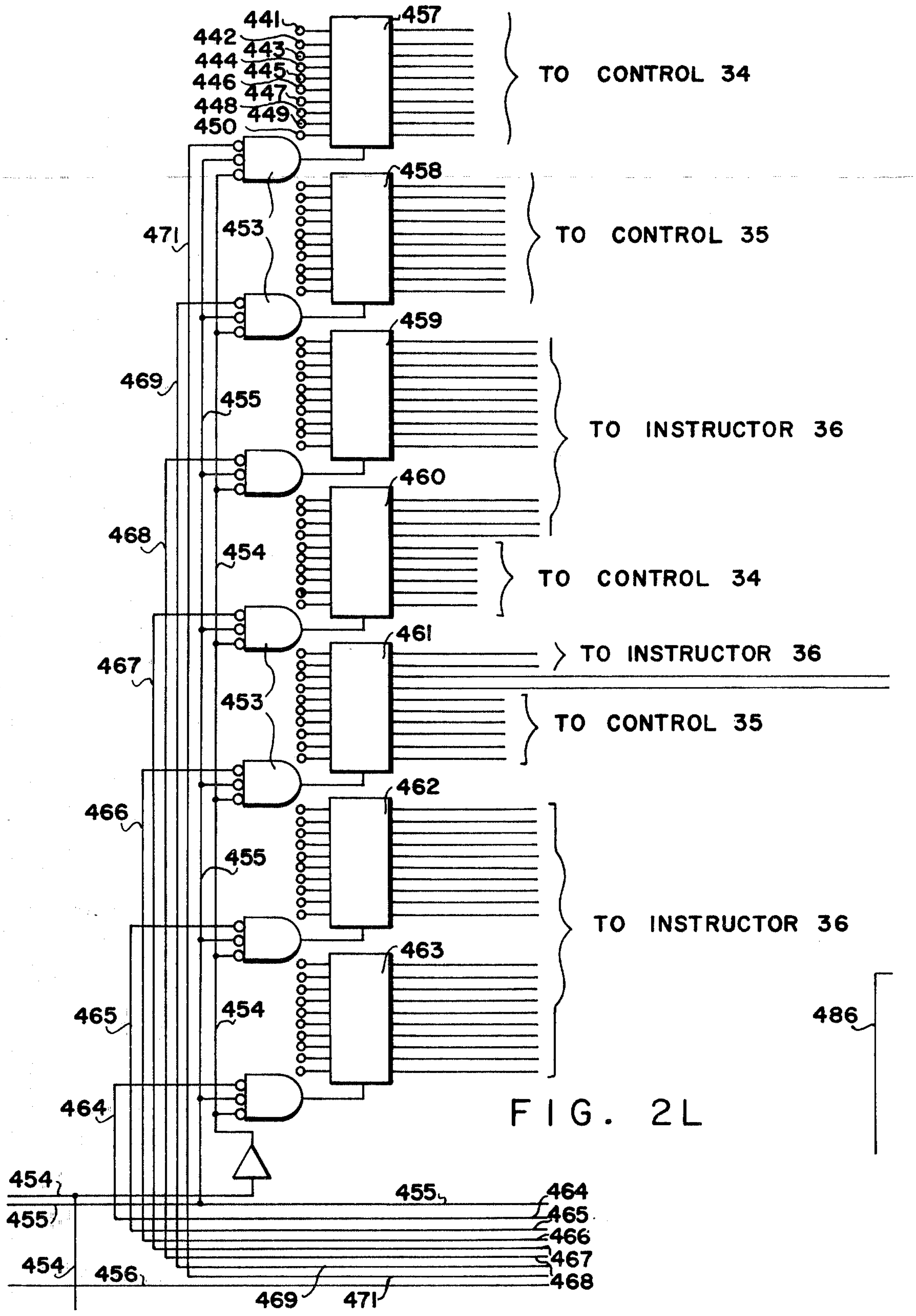
Figure 2M:
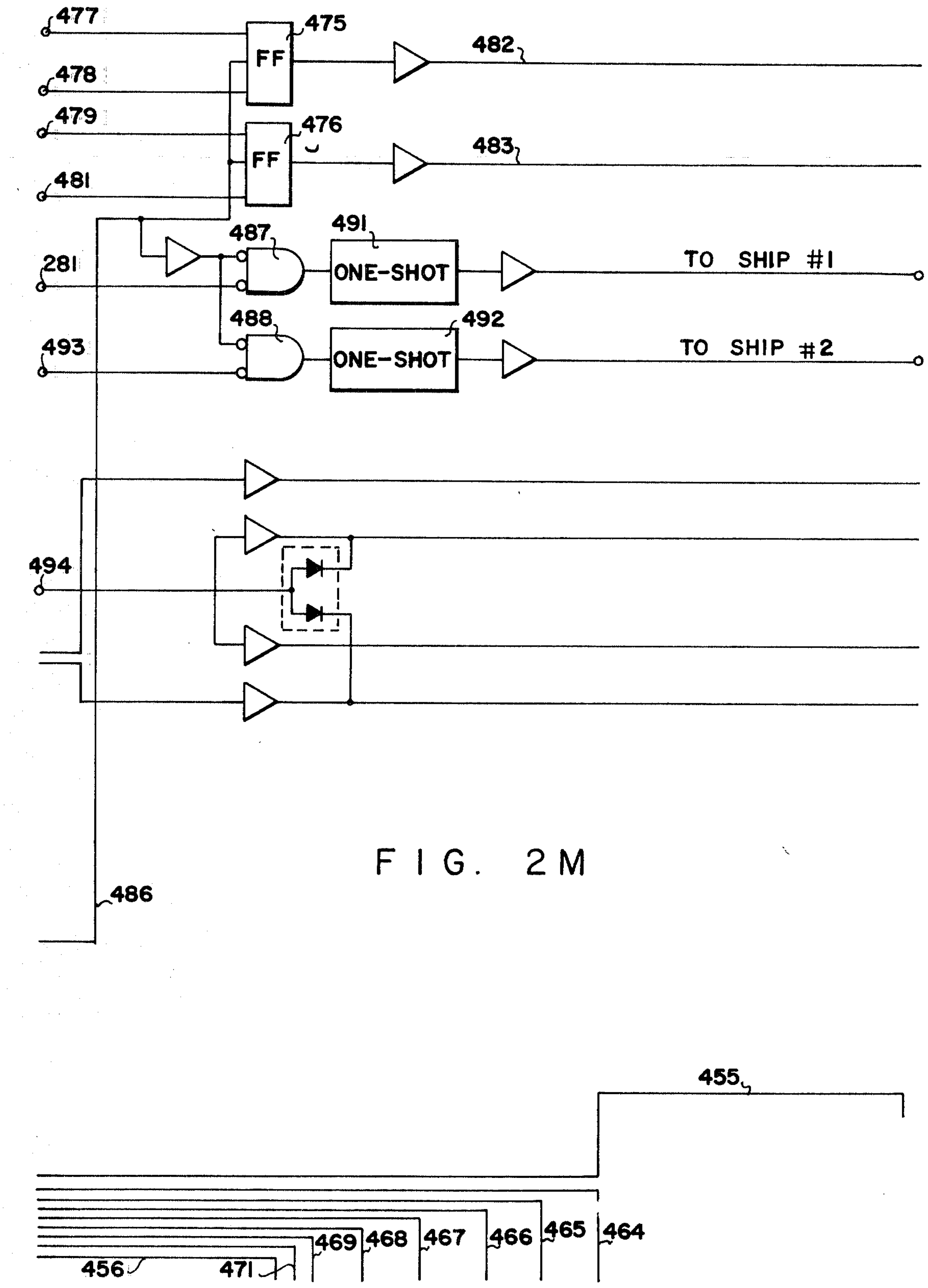
Figure 2N:
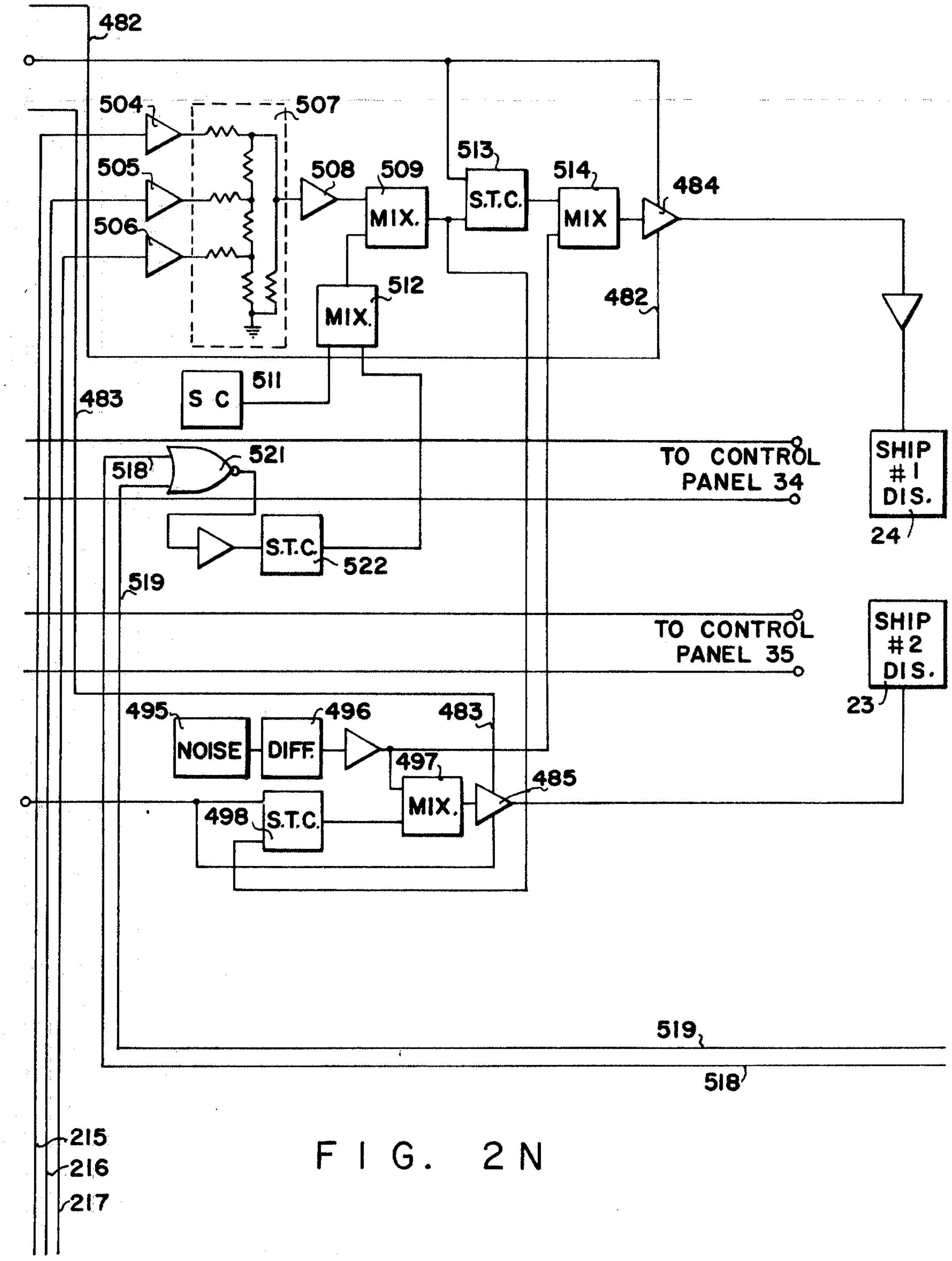
Figure 2P:
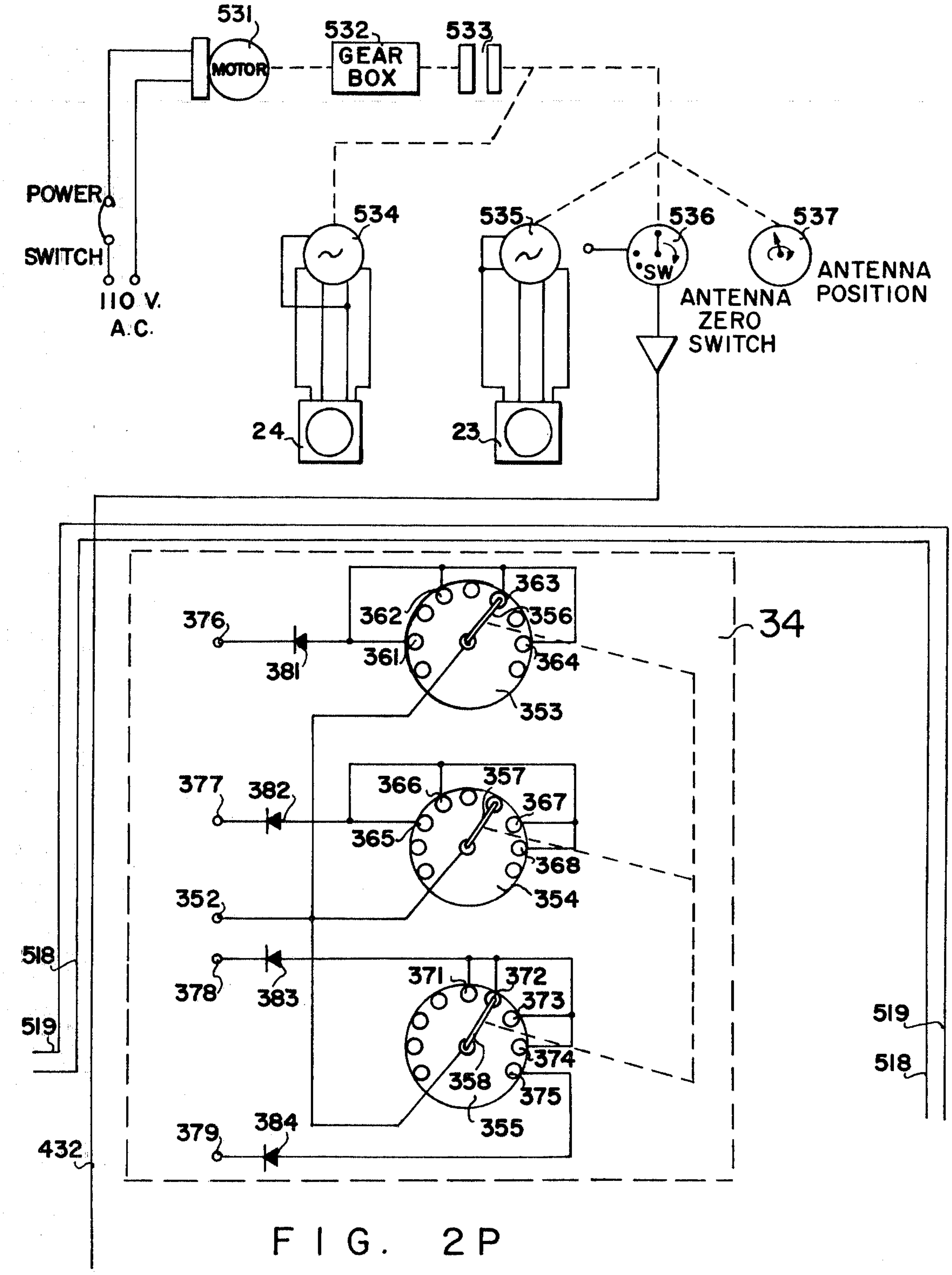
Figure 3:
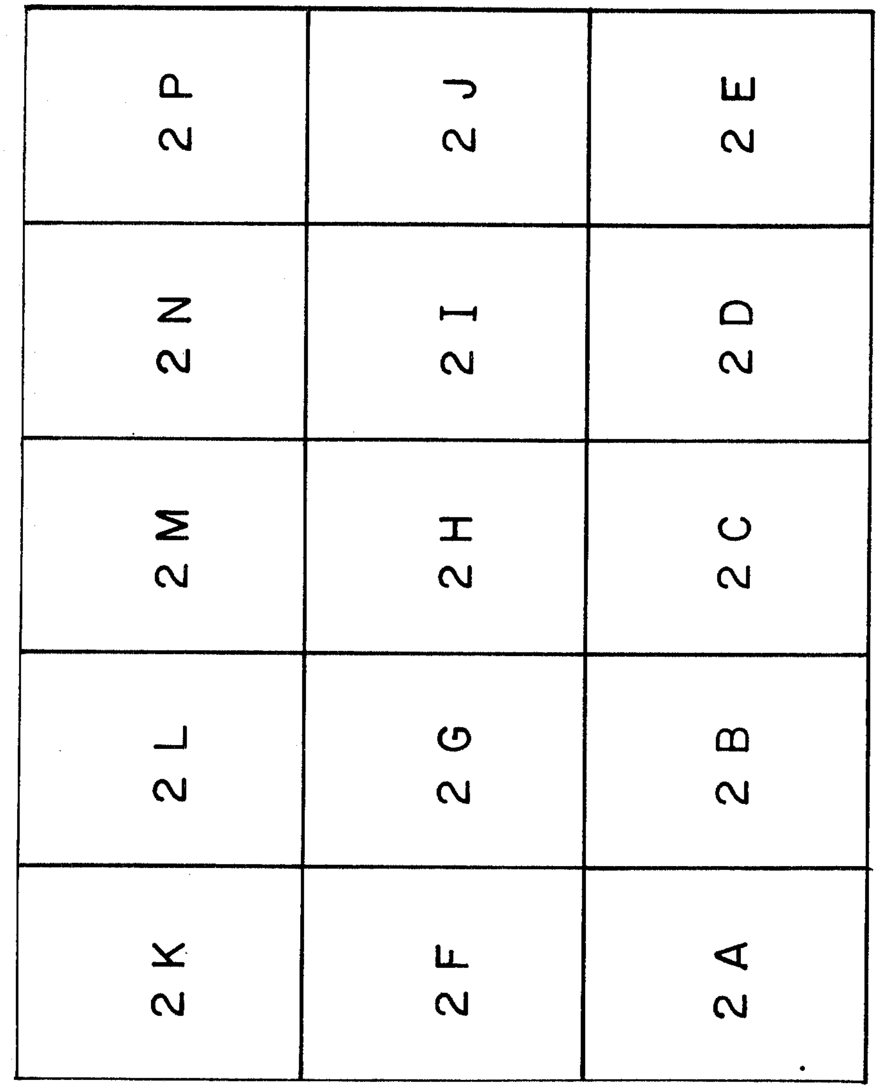

Other objects and advantages of this invention will become more apparent as the following description proceeds, which description should be considered together with the accompanying drawings in which:

FIG. 1 is a functional block diagram of the system of this invention;

FIG. 2A through 2N and 2P comprises a detailed block and schematic diagram of one embodiment of the apparatus of this invention; and FIG. 3 is a mosaic which shows the arrangement of FIG. 2A through 2N and 2P.

Referring now to the drawings in detail, and to FIG. 1 in particular, the reference character 11 designates a general purpose digital computer. Since the computer 11 is any standard machine which is readily available on the market, only its input-output bus has been shown and designated. The data output bus 13 feeds data from the computer to an output buffer 16, from which it is applied to the input of an output interface or translator 17. The output interface 17 has a plurality of output lines, one of which feeds information to a source of miscellaneous signals 19 and another to the input of a radar output logic 21. The output from the radar output logic 21 is applied as an input to a video processor 22. Two radar display devices 23 and 24, one for each of the two ships simulated by the apparatus of this invention, are fed with video signals from the output of the video processor 22. In addition, each of the display devices 23 and 24 also receives sweep synchronizing signals from an antenna simulator 25, which also applies antenna synchronizing signals as an input to an input interface 26. The output of the input interface 26 is applied to an input buffer 27 which supplies the information to the input bus 12 of the computer 11. The operation of the output interface 17, the miscellaneous signal generator 19, the radar output logic 21, and through those components other portions of the system, are tied together in time by a clock 18.

In addition to the data input-output bus of the computer 11, it also has an address bus 14 and a control bus 15. The outputs of the address and control buses 14 and 15 are applied to the inputs of a control buffer 31 which supplies information to a control unit 32. The outputs of the control unit 32 are applied to inputs of the input buffer 27, the input interface 26, the output interface 17 and an address decoder 33. Decoded addresses from the address decoder 33 are applied to the inputs of the input interface 26 and the output interface 17 as well as to the input data bus 12 through the input buffer 27. Each of the ship displays 23 and 24 has associated with it a ship control 34 and 35. An instructor station 36 receives inputs from the output interface 17 and applies information to the computer 11 through the input interface 26.

Before discussing the operation of the device shown broadly in FIG. 1, some introductory remarks would be valuable. The system shown in FIG. 1 is not necessarily an exact arrangement of parts as they appear in the actual device, but, instead, FIG. 1 has been arranged to illustrate and explain the overall operation of the system of the invention. For this reason, names have been applied to the blocks shown in an effort to depict the function of the block in the overall system rather than to accurately categorize the apparatus. The arrangement of FIG. 1 is a functional arrangement. It is assumed that the computer 11 is a standard, general-purpose computer sold on today's market by any of several computer manufacturers. The basic requirements of the computer 11 are that it have sufficient speed of computation to perform all of the necessary computations in the time of the radar sweeps, that the memory be sufficiently large to contain all of the information to be stored in it in table form and to also hold the results of the computations until they are needed, and that the outputs of the computer be readily translatable into video signals for controlling the radar displays. All of these requirements can be met by several digital machines. In general, the computer is used to compute the relative locations of the positional information stored in its memory with respect to the ever-changing position of the ships being simulated. To illustrate, information pertaining to the relative positions of points of land are stored in the memory of the computer. This information is different for each different geographical location. In one device constructed, the geographical location being simulated was the entrance to Chesapeake Bay, Thimble Shoal Channel, Chesapeake Channel, Cape Henry Channel and a portion of Hampton Roads. Obviously, for a realistic display, the appearance of the coastline must change as the simulated ship proceeds up the channel. This positional information must be continually updated by the computer as the ship's mission proceeds, and the updating must take into consideration the speed and heading of the ship, the prevailing sea currents, movements of other ships, etc. From the newly computed information, video signals are generated to produce the proper display. This invention contemplates using any of a number of different displays, such as television equipment, radar PPI displays, and the like, but the most desirable appears to be an actual operational display device. Therefore, if radar is being simulated, then the ship #1 display 24 and the ship #2 display 23 are most desirably standard radar display devices. In such a system, the computer 11 can be said to stimulate operational equipment to produce realistic showings of a problem. In addition to the computer and the operational display devices, a translator must be used. This device, also called an interface, translates computer language into the langauge of the display device and translates the display device language into that useful in the computer. When the computer, which is a commercial general-purpose computer, and the display device, which is a standard operational display device, are combined with the interface equipment and are operated according to the methods developed, a realistic training device is created.

Referring again to FIG. 1, it is assumed for this discussion that information defining the land masses to be simulated have been stored in the memory of the computer 11. No memory has been shown since the computer 11 is assumed to be a standard general-purpose computer which incorporates a memory as a normal piece of equipment. The information stored in the memory defining the land mass, or any other object to be depicted, is stored as a series of words representing individual sweeps of the radar beam. For this discussion, it is assumed that a marine radar system is being simulated and that the system uses a PPI (plan position indication) sweep. A PPI sweep is a radial sweep where the center of the cathode ray tube face represents the ship's position and where the motion of the cathode beam is from the center outward along a radius, each successive sweep or radius being displaced from the preceding one so that a radial line appears to be sweeping around the face of the tube. If the radius is defined by a finite number of discrete positions, then each position on such a line can be identified by a binary number. Binary information is assumed in this discussion for simplicity, although other types of information representation can also be used. If it is assumed that each position is identified as being dark (no target present) when zeros appear in the binary representation for that point, then a target can be identified by a one in an appropriate bit position of the group which defines that point. For example, each point on a radial may be defined by four bit posiitons. When a radius is defined, the words representing that radius contain all zeros except at the point along that radius where a target is to be shown. The first bit of the four which represents that point may be a one. This would be sensed in the interface and operate to alert the brightness decoder. The next three bit positions would then contain ones and zeros in combination to define the brightness of the target. Thus, with three bit positions, seven intensities of target brightness can be achieved. The interface translates this information into video information which is used to modulate the cathode beam to produce the proper brightness at the proper point on the face of the CRT.

It is often convenient to record positional information in the computer memory in rectangular coordinates, since this is the manner in which geographical information is given—in longitude and latitude. However, the positional information displayed on the cathode ray tube display using a PPI sweep is in polar coordinates. Therefore, in such cases it becomes necessary for the computer to convert the positional information from rectangular to polar coordinates. For this purpose, it may be necessary to also store in the computer memory trigonometric tables so that this computation may be rapidly achieved. The computer 11 can be programmed to perform the necessary computations upon command and automatically, but it is still necessary to convert the results of the computer's computations into information which can be utilized by the particular displays being used. In this case, the display devices are standard marine radar sets. It is the "interface" equipment of this invention which accomplishes the tasks and renders the entire system feasible and operable.

The information which defines the "fixed" items of the display such as the coastline, the buoys, piers, bridges, etc. and which is stored in the computer is defined in the computer with reference to a fixed point in the area being displayed. This may be the center of the display area, it may be one corner, or it may be a suitable latitude and longitude. The information is then stored in sequence so that each computer word bears a specific positional relation to that point. Since only a portion of the entire area to be displayed is shown on the display device at any time, a computation is necessary to relate the positional information in the computer to the center of the display screen, which is the location of the ship being simulated. As the center of the display screen changes its location with respect to the coastline or other "fixed" elements of the display, the positional information is continually repositioned, and the computations required to relate the changing screen center to the information is performed in the computer. The resulting computer output is a series of binary pulse positions which are applied from the data output bus 13 of the computer 11 to the output buffer 16. From the buffer 16, the information is applied to the output interface 17 where it is converted into the radar addressing from the computer addressing. After the information has been decoded so that it is in the address system used on the radar display, a radial sweep address, it is applied to the radar logic unit 21 which synchronizes the computer synchronized information with the radar displays. From there, the radar synchronized information is applied to the video processor 22 where it is converted from binary information into video information. As mentioned above, the intensity of the display at any point can be coded into the four binary bits which define that point. This information is decoded into a potential which controls the beam intensity of the radar display, and the generation of the video information is accomplished in the video processor 22. The output of the video processor 22 is applied to the radar displays 23 and 24.

There are two ships which are being simulated at the same time in the system shown on FIG. 1. Each ship has the ability to maneuver separately and to have its portion of the overall display area shown on the display device assigned to it. This means that the apparatus of FIG. 1 is running two separate simulated missions at the same time. The output interface 17 serves to separate the information for the two missions and to forward the appropriate information to the proper display device. Using the apparatus of this invention, several separate missions can be run at the same time. However, the addition of each problem to the system requires additional computer time, and the computer selected for the system must be capable of handling all of the necessary computations in the time it has available. The clock 18 supplies timing information to the output interface to aid in timing the two separate missions. It should be noted, in passing, that the two separate missions are handled by the same equipment throughout the system.

The miscellaneous signal generator 19 supplies special signals which might be desired in such a trainer. For example, one training system built in accordance with this invention included an alarm which excited both a visual and an aural signal when the simulated ship came within two miles of a moving target ship. The signals to accomplish such actions are generated in the miscellaneous signal generator 19 and are applied directly to the ship's display devices. Another special signal which has been used and which is generated in the generator 19 is the simulation of the operational radar marker or flasher. This signal turns the sweep in the cathode ray tube display device on for the entire radial sweep which represents the heading of the ship as in the operational device. This enables a helmsman or a student to more clearly see the direction of movement of his ship and the manner in which it maneuvers. Other signals of this type which may be considered useful in particular trainers may be generated in the generator 19.

Since the timing of the system is important, the clock 18 supplies timing pulses directly to the output interface 17, the radar output logic 21 and the miscellaneous signal generator 19. The clock pulses are used to step the stepping counters in the radar output logic 21, to trigger and time the marker and similar signals, and to control the decoding of the computer output. In addition, the identification of the positions along any radial sweep at which a target is to be displayed is also a timing problem. The timing of the system will be further considered in the detailed explanation below.

The control of the radar display device is performed by the computer through the output interface. The control of the computer can be considered to be accomplished by the instructors station 36 and the two ships controls 34 and 35 through the input interface. Information is applied to the data input bus 12 of the computer 11 through the input buffer 27 by the input interface 26. The input interface 26 receives its information from several sources. When problems or missions are to be run on the trainer, the initial conditions for both missions are inserted into the computer by the instructor through the instructor station 36. The instructor station 36 contains switches by means of which the instructor can place each of the simulated ships 23 and 24 at particular locations, the initial locations of the target ships can be set, the buoys can be placed, and the dynamic characteristics of each of the ships and target ships can be determined. This information is digital and is supplied by the manipulation of switches. When the switches have been set according to the instructor's wishes, the information is transferred from the instructor station 36 through the input interface 26 where it is converted into computer arrangement and timing, and through the input buffer 27 to the data input bus 12. The location of the ships and the other information pertinent to the problem being run, such as ship speed and direction, can be determined from digital or similar display devices incorporated into the instructor staton 36. This information comes from the data output bus 13, the output buffer 16, and the output interface 17. Similar information unique to each ship is also displayed on suitable display devices incorporated into the ship controls 34 and 35. The flow of display information is the same for the instructor station and the two ship control panels. In addition, once the missions have been set up and are running, the students at the two ships controls 34 and 35 can control the simulated movement of their individual ships through the gaming areas by the manipulation of speed and rudder controls on the ship control panels 34 and 35. This information, which is also digital, is applied to the computer 11 through the same channels as the information from the instructor station 36, through the input interface 26, the input buffers 27 and the data input bus 12. The speed and heading of the ships are fed to the control panels 34 and 35 from the computer 11, through the output interface 17. Similarly, the information which is digitally displayed in the instructor station 36 is also available from the computer 11 through the output interface 17.

In addition to the information computed in the computer for displaying on the faces of the cathode ray tube display devices 23 and 24, other information is formed by the computer and presented for digital display on the instructor station 36 and the two control panels 34 and 35. A plurality of words which contain information relating to the heading of the ships and the targets, the speed of the ships and targets, etc. are formed in the computer from information applied at the instructor station 36 and the control panels 34 and 35. When the instructor supplies the computer with information defining the initial characteristics of one of the ships, for example, that information is scanned from the switches on the instructor panel 36 and applied to the computer in a prescribed order through the input interface 26. The order in which the information is read into the computer is controlled by the control unit 32 and the address decoder 33. This information then makes up a plurality of words which is arranged in a specific order. When the information is applied to the appropriate digital displays on the instructor station 36 or the control panels 34 and 35, it is fed from the computer 11 through the control and address buses 14 and 15 to the control buffer 31 and the control unit 32. The information is stored in predetermined locations in the control unit 32, and as the information is fed into the control unit 32, it is counted. The counter is decoded in the address decoder 33 to maintain control of the storage locations. The information which is stored in the control unit is updated periodically, and the updating follows the same pattern. This information is then applied through the output interface 17 to the miscellaneous signal generator 19 to trigger the generation of the special signals used in the trainer as mentioned above. Even though the information is supplied at both the input and the output in a prescribed series, the instantaneous address of the information is required to ensure the generation of the proper signals at the propertime. Therefore, the input and output addresses of the information are both decoded.

Separate from the other devices in the overall system is the radar antenna which is simulated by a separate circuit 25. In one particular model of the system constructed, the antenna simulator 25 was an electromechanical device which included a synchronous motor driving synchro-generators and cam switching means. The synchro-generators generated the signals which controlled the sweep coil motors in the radar sets 23 and 24 so that the rotation of the sweeps were synchronized. In addition, the cam switches defined 0° so that the beginning of each sweep was clearly identified. After the initial switching signal, each degree is counted to maintain rotational accuracy and to provide a reference for the computer information.

From the above description of the system, it can be seen that this system comprises a digital computer which performs computations on information supplied to it and stored in its memory to generate information which is translated by the interface equipment into video signals for controlling operational radar sets. In this manner, a realistic radar display is simulated. The information which defines those portions of the cathode ray tube face which are to be illuminated to represent radar targets is stored in the computer memory to define a particular geographical area. The area stored is many times greater than that displayed at any time. For location purposes, one point in this area is usually selected as the zero-zero point, and all other points are related thereto. The computer is programmed to perform the computations necessary to relocate the stored information as a mission proceeds. However, some of the parameters are left blank in the stored program. This information is supplied initially by the instructor by means of the switches mounted at the instructor station 36, and by the trainee as he manipulates the speed and heading switches on the control panels 34 and 35. The initial location information supplied by the instructor defines the point in the stored area at which a particular ship is located. The information then applied from the computer 11 to the output interface 17, the radar logic unit 21 and the video processor 22 is the area immediately surrounding that initial location for the range of the instrument. As the mission proceeds, the location of the ship is gradually changed by computer computations, and the area shown on the ship display devices 23 and 24 gradually changes. The computations performed by the computer 11 are normal computations, but their meaning is interpreted for the trainer use by the interface equipment described above in general terms. The following descriptions considered with the several portions of FIG. 2 are detailed descriptions of the same apparatus.

Referring to FIGS. 2A and 2B, the output buffers are shown in the dashed lines at 16, and the output interface is shown inside the dashed lines at 17. The output buffers

16 are formed of standard logic items. Thus, each of the output lines 101 from the computer output bus 12 is connected to a buffer 102 whose output is applied as the input to an amplifier 103 which serves as in inverter. The output from the inverter 103 is simultaneously applied to the input of another inverter 104 and to one input of a gate 106. Gates 105 and 106 are connected as a pair of gates each having three inputs, and the output from the inverter 104 is applied to an input of gate 105. In addition, each of the gates 105 and 106 have inputs applied to them from each of clock lines 108 and 109. This arrangement is the same for all of the lines 101 from the computer 11. In other words, each line 101 from the computer 11 is connected through a buffer 102 and a pair of inverters 103 and 104 to one input of each of two gates 105 and 106. Since one input is the inversion of the other, one gate 105 receives a zero signal when the other gate 106 receives a one signal from the same condition on the same line 101. The outputs from the two gates 105 and 106 are applied to the two different inputs of a single flip flop 107. The flip flop 107 is one of eight flip flops which constitute a register #1, identified by reference character 111. Both of a pair of timing gates 112 and 113 have one input grounded and another input connected to a timing line 114, and have their outputs connected to timing lines 108 and 109 respectively. The other two inputs of the gates 105 and 106 are connected to the lines 108 and 109. Each of the flip flops 107 has two outputs, a one and a zero output. These outputs are directly connected to the inputs of shift register #2, identified by reference character 115. Thus, the two registers 111 and 115 are a pair with the outputs of one being connected to the inputs of the other. Registers #3 and #4, designated 116 and 117 respectively are similarly connected with data output lines 101 from the computer 11 being connected through the input buffer 16 to the input of register 116, and the outputs from register 116 being connected to the inputs of register 117. In the device of this description, which is but one configuration the system can assume, a computer having a word length of 16 bits is used for this discussion. In addition, it is assumed that the computer is a parallel machine to provide the desired speed. Therefore, there are 16 data output lines and 16 data input lines. For ease of description, the 16 bit registers have been broken in two, forming two pairs of 8 bit registers 111 and 116 and 115 and 117. The register 111 is shown in detail; the other registers 115, 116 and 117 are shown only as blocks. Since the registers, for the purposes of this description at least, can be considered to be identical, this arrangement reduces the detail which must be shown and the amount of the required explanation. In the same manner, the output buffer 16 has been broken into two parts, one part being shown on FIG. 2A and the other on FIG. 2B. Since the separate parts are constructed the same, it is necessary to describe only one. The outputs from the registers 111, 115, 116 and 117 are taken in parallel from lines 118.

The output buffer 16 is just that. It serves to decouple the computer output lines 101 from the output interface 17. However, the output buffer 16 is designed to perform an additional function, that of transferring information from the computer 11 to the output interface in the best form for the interface 17. For this reason, the output buffer 16 includes, in addition to a buffer 102 for each line 101 from the computer 11, a pair of serially connected inverter drivers 103 and 104. To provide positive setting of the individual flip flops 107 in the registers 111 and 116, a separate input signal is applied to the individual one and zero inputs of the separate flip flops 107. To provide this upon the occurrence of a signal on a line 101, two signals of opposite polarities are applied to the flip flops 107 by the two inverter drivers 103 and 104 connected in series. In addition, the inputs of the flip flops 107 are both fed by the same type of component for impedance and load matching. Thus, if the top line 101 has a positive pulse applied to it, the input to the inverter 103 is positive, the input to inverter 104 is negative, and the output of the inverter 104 is positive. In this way, a positive pulse is applied to an input of the gate 105 and a negative pulse is applied to an input of the gate 106. Since the gates 105 and 106 pass signals only when all inputs to that gate are negative, only gate 106 can conduct under these conditions. Should the signal on the top line 101 be negative, then the reverse situation would be true. Actually, to keep the inventory small the registers 111, 115, 116 and 117 are all shift registers, but registers 111 and 116 are connected so as not to shift the information contained therein. Once registers 111 and 116 are filled, clock pulses applied to the gates 112 and 113 of registers 115 and 117 transfer the information from the individual flip flops of the registers 111 and 116 into the individual flip flops of the registers 115 and 117. Then, the subsequent application of clock pulses to the gates 112 and 113 of registers 115 and 117 along lines 122 and 123 causes the information contained therein to shift, step-by-step, upward from the bottom so that each bit of information appears at the output lines 118 in sequence. This accomplished a transfer from a parallel form of presentation from the output of the computer 11 to a serial form. Appropriate clock pulses to accomplish the shifting are applied to the two registers 115 and 117 through the clock line 129. The information from the output interface 17 is in the form of binary bits following one another in series. The radar logic circuit 21 and the video processor 22 convert this train of binary information into the video form required by the display devices 23 and 24.

However, before discussing the construction and operation of suitable radar logic circuits and video processors, the timing circuits should be described. Several places above, clock or timinng pulses have been introduced into the discussion without really indicating where they are generated. The clock circuits are shown in detail on FIGS. 2D and 2E. A free-running oscillator 125 (FIG. 2D) generates rectangular pulses which are applied through an amplifier 126 to a line 129 which supplies the shift pulses for the registers 115 and 117 on FIG. 2B. Also, the output of the amplifier 126 applied pulses to the input of another amplifier 127 which drives a string of binary counters 131, 132, 133 and 134 in parallel through a line 128. The outputs from the counter stages 131, 132, 133 and 134 are applied as inputs to gates 145, 146 and 147. The outputs from the counter stages 132 and 131 are applied as inputs to gate 145; the outputs from counter stages 131, 132 and 133 are applied as inputs to gate 146; and the outputs from counter stages 131, 132, 133 and 134 are applied as inputs to gate 147. The output from the gate 145 is applied as an input to counter stage 133, the output from gate 146 is applied as an input to counter stage 134, and the output from gate 147 is applied through an amplifier 148 to the one input of a gate 149. The output of gate 149 the other input to which comes from the output of the amplifier 127 is applied through an amplifier 153 as inputs to a gate 151 and to another amplifier 154. The output from stage 158, the same output which is applied flop 152. A chain of binary counters 135, 136, 137, 138, 139, 141, 142, 143 and 144 are connected in cascade with the input to the chain supplied by the output of counter stage 134. One output from each of the counter stages 135–143 is applied to the input of the next stage, and the other output is connected to further circuitry on FIG. 2E. Three binary counter stages 157, 158 and 159 are connected in cascade controlled by the outputs from gates 161, 162 and 163. One output from stage 138 is connected to one input of gate 161, the other inputs to which come from the outputs of stages 136 and 157. The output of gate 161 is applied as an input to stage 157. The other output from stage 136 is applied as an input to gate 162 which has applied to its other inputs the outputs from stages 134 and 158. The output of the gate 162 is an input to counter stage 158. In a similar manner, one input to gate 163 is supplied by an output from the stage 139, another from the stage 136, and the third from the stage 159 which receives the output from the gate 163. One ouput from stage 158, the same output which is applied to the gate 162, is applied as inputs to gates 164 and 167. Gates 164 and 167 also receive inputs from stages 135 and 144, the two outputs from stages 144 being different. The other outputs from the stages 157 and 158 are connected together and to the other input to gate 151. The output from the gate 164 is applied to an amplifier 165, and the output from gate 167 is applied to an amplifier 168, the outputs from the two amplifiers 165 and 168 providing synchronizing signals for other equipment.

The oscillator 125 provides the system with a train of rectangular pulses of fixed frequency. However, not all operations take place at that frequency, so the output of the oscillator 125 is applied as the input to a synchronous counter comprised of stages 131, 132, 133 and 134. In this counter, each stage has each output pulse from the oscillator applied to it, but each stage counts only when the other input to it is of the proper level. The second input to each of the counter stages is derived from the previous stages. Thus, stage 132 is controlled by the condition of stage 131 directly; stage 133 is controlled by the condition of stages 131 and 132 through the gate 145; and stage 134 is controlled by the condition of stages 131, 132 and 133 through the gate 146. Each pulse from the oscillator 125 changes the condition of the stage 131. Assume for this discussion that the upper output of each stage is the one output. Then, the condition of stage 132 is changed only when stage 131 is one and an output pulse from the oscillator occurs. In the same manner, stage 133 changes condition only when stages 131 and 132 are in the zero state and a pulse output from the oscillator 125 occurs. Stage 134 changes condition only when the preceding three stages are in the zero state and oscillator 125 provides a pulse. Thus, each of the stages 131–134 can be considered to constitute a divider, providing an output for each two outputs of the preceding stage. In other words, the counter counts down in steps of two. The counter formed by stages 135–144, on the other hand, is a "ripple counter" which also divides by two at each stage, but wherein each stage is triggered into its next condition by the preceding stage alone. The action of the synchronous counter is more rapid than that of the ripple counter since the last stage of the ripple counter cannot change its condition until all of the earlier stages have done so. The individual outputs of the stagse 131, 132, 133 and 134 are applied to the gate 147 which is not opened until all of the mentioned stages are in the zero state. At this time, a pulse is passed to line 122 which carries a timing signal to the registers 115 and 117 of FIG. 2B. The output of the gate 147 is also applied through an amplifier 148 to one input to a gate 149 which passes a pulse each time that an output from both the gate 147 and the oscillator 125 appears. This output from gate 149, passing through amplifiers 153 and 154, is the timing signal which is applied by line 123 to the registers 115 and 117 of FIG. 2B. The operation of the individual counter stages 157, 158 and 159 are controlled by the outputs of the various stages of the ripple counter through the individual gates 161, 162 and 163. As shown, gates 161, 162 and 163 open only when all of the three inputs to each are low. This is indicated by the small circles at each of the inputs. On the other hand, a high signal applied from one stage to the next will cause that state to change state. So, stage 157 changes its stage only when its input from the output of stage 143 is high and inputs to gate 161 are low. Various combinations of the states of the separate counter stages shown on FIGS. 2D and 2E generate timing signals at the proper times for the operation of the equipment. Where the particular timing is important to an understanding of the operation of the individual devices, that timing and its generation will be discussed at that time.

The output signals from the output interface 17 are applied to the radar logic circuit 21. This is shown on FIG. 2C with the output lines 118 from the shift register 115 applied as inputs to a four-stage shift register comprising flip flops 171, 172, 173 and 174. The two lines 118 from register 115 are connected to the two opposite inputs to the flip flop 171, the two outputs of which are applied as inputs to the flip flop 172. The remaining flip flops 172–174 are connected in cascade in this manner. In addition, clock pulses are applied to the input of each flip flop 171–174 along line 128 from the output of the oscillator 125 (FIG. 2D). In addition to the output of one flip flop being applied as an input to the next following flip flop, lines 176, 177, 178, 184, 185 and 186 monitor the contents of the register at each stage of the proceedings by taking the outputs from flip flops 171, 172 and 173 respectively and applying these outputs as inputs to three additional flip flops 181, 182 and 183. The inputs to gate 187 are supplied through line 129 which is an output from the oscillator 125, the zero output from flip flop 174, and the one output from a flip flop 188. Flip flop 188 is the third in a line of three flip flops which includes also 191 and 192. The two inputs to flip flop 191 are supplied by a gate 189 with one input being through an inverter 193. Similarly, the two inputs to flip flop 192 are supplied by a gate 194 with one input being through an inverter 195. The inputs to the flip flop 188, whose output is applied to one of the inputs to the gate 187, are supplied from a gate 196 with one input being applied through an inverter 197. One of the inputs to the gate 189 is supplied by the one output from flip flop 188, and the other input is supplied by the zero output of flip flop 174. One of the inputs to the gate 194 is supplied by the one output of the flip flop 191, and the other input is supplied by the output of the gate 189. An input to the gate 196 comes from the one output of the flip flop 192, and the gate 189 supplies its other input. A group of gates 198, 201, 202, 203, 204 and 205 comprise a decoding circuit for evolving potentials representative of the various levels of intensity for the targets shown on the displays 23 and 24. The two inputs to gate 198 are supplied by the zero output of flip flop 192 and the zero output of flip flop 171. The output of gate 198 is one input to gate 202. Gate 201 has three inputs, one from the zero outputs of each of the flip flops 181, 182 and 183, and a single output which is applied as the other input to gate 202. The gate 203 has three inputs, one from the zero output of flip flop 181, another from the zero output of flip flop 191, and a third from line 214 which carries the other output from the binary counter stage 159. Similarly, flip flop 204 has three inputs which come from flip flop 182, line 214, and flip flop 191. The three inputs to the gate 205 come from the flip flop 183, the line 214 and the flip flop 191. The single outputs from gates 202 and 203 are applied as separate inputs to a NOR gate 206, whose output is taken through an amplifier 211. A second NOR gate 207 receives its inputs from the gate 202 and gate 204 and applied its output through an amplifier 212. The output of the gate 205 is applied to line 217. The output from the amplifier 211 is applied to line 215, and the output from amplifier 212 is applied to line 216.

The output from shift register 115 on FIG. 2B is applied through the two lines 118 as the two inputs to the flip flop 171. The two lines 118 carry opposite level signals. If the top line 118 is high at any time, then the lower line 118 is low, and the reverse is always true. This means that at any time, two opposite signals are applied as the two inputs to the flip flop 171 to place that flip flop into one of its two stable conditions. A timing signal from the oscillator 125 through the inverter drivers 126 and 127 are applied through line 128 to the shift input of the flip flop 171 as well as the same input, at the same time, of flip flops 172, 173 and 174 to transfer the information contained in each of those flip flops to the next following flip flop. Thus, as the information which was transferred in parallel from the shift registers 111 and 116 to the shift registers 115 and 117 is shifted vertically in the registers 115 and 117, the information appears in serial form at the two output lines 118. This sequential information is applied as the input to the small shift register comprising the flip flops 171–174. At any instant, four bits of information are contained in the register 170. Going back to a statement made earlier in this specification, each point at which a target can be shown on the face of the displays 23 and 24 can be represented by four bits of information arranged in sequence. Assuming, for the sake of this discussion, that each target spot on the displays is so defined in this apparatus, then at any time the contents of flip flops 171–174 can represent the complete information to define a single spot at which a target can be represented. In a situation of this nature, the first of the four bits would represent a trigger or flag which indicates the presence of a target at that particular location, and the remaining three bits of information would contain information relating to the intensity of that target. In one form of the apparatus, a single radial sweep was represented by binary information which consisted of 63 words containing 16 bits each. This is, of course, but exemplary of the equipment. Since each bit represents a prescribed interval of time and four such bits are used to represent a single target, the resolution along the radial could be limited by the time occupied by four bits. In order to improve this resolution, the register 170, comprising the flip flops 171–174, is provided. As information proceeds serially from the output of the shift register 115 and is applied to the register 170, the presence of a pulse in any position, whether it be a position represented by a multiple of four or not, can be sensed. Thus, whenever any four bit positions occupy the flip flops 171, 172, 173 and 174 with a pulse in flip flop 174, the zero output of the flip flop 174 is applied as an input to gates 189 and 187. When the flip flop 174 contains a pulse, the information contained in the flip flops 171, 172 and 173 must be transferred to the flip flops 181, 182 and 183 for decoding. It is the information contained in the last-mentioned three flip flops which is decoded to produce the intensity signals required by the display devices 23 and 24. Of course, if a pulse appears in flip flop 174, then there must be at least one additional pulse in one of the flip flops 171, 172 and 173. To prevent that additional pulse, or pulses, which define intensity, from inadvertently being detected as a flag, the operation of the equipment shown on FIG. 2C must be disabled for three pulse times to enable the information contained in the flip flops 171, 172, 173 and 174 to be replaced by subsequent information. Since the register 170 is a shift register, at least three pulse times will be required to shift the information out of it. Flip flops 191, 192 and 188 comprise another shift register 180 used as a counter. Assuming that the shift register 180 contains nothing but zeros, then the one output of the flip flop 188 will enable (not disable) the gates 187 and 189. When flip flop 174 is placed in the one state, then that disable signal is removed from the gates 187 and 189. With two low inputs to the gate 189, that gate opens and provides signals for the flip flops 191, 192 and 188. The next clock pulse on line 128 is applied simultaneously to the three flip flops 191, 192 and 188. This loads all three flip flops with ones. So long as the flip flop 191 contains a zero, gates 203, 204 and 205 are disabled. When flip flop 191 contains a one, gate 194 is disabled. When flip flop 192 contains a one, gate 196 is disabled. When flip flop 188 contains a one, gates 187 and 189 are disabled. Once the three flip flops 191, 192 and 188 have been loaded with ones, gate 189 becomes disabled and loses its output. The next clock pulse appearing on line 128 drives flip flop 191 into the zero state. When gate 189 loses its output and flip flop 191 returns to the zero state, gate 194 becomes enabled and the next subsequent clock pulse drives flip flop 192 into the zero state. When gate 189 has no output and flip flop 192 is in the zero state, gate 196 is enabled and the next subsequent clock pulse on line 128 drives flip flop 188 into the zero state. This last step removes the inhibitions placed by flip flop 188 on gates 189 and 187. From the above, it can be seen that once the shift register 180 has been loaded with ones, the gates 189 and 187 remain inhibited for at least three pulse times. The removal of the inhibitions from gate 187 permits the three flip flops 181, 182 and 183 to receive parallel information from the flip flops 171, 172 and 173, respectively. Disabling gate 187 prevents this from occurring. Gate 187 is enabled when flip flop 188 is in the zero condition, when flip flop 174 is in the one condition, and when a clock pulse appears on line 129. Since the two lines 128 and 129 are separated by an inverter 127, a pulse appears on line 129 half a pulse time before one appears on line 128. Therefore, gate 187 is opened prior to the pulse on 128 which causes the shifting of the information in the shift register 170. During that half pulse time, the information from shift register 170 is transferred to the flip flops 181, 182 and 183. Once gate 187 is disabled, further transfer of information into the flip flops 181, 182 and 183 is prevented. Gate 187 is disabled when flip flop 188 is placed into the one state. Therefore, the information contained in flip flops 181, 182 and 183 will remain there at least for the time that the shift register 180 is shifting until the flip flop 188 is again cleared to zero. This requires three clock pulse times. During these three pulse times, the information in the shift register 170 is also being shifted. Once the flip flops 181, 182 and 183 are loaded, their outputs control the enabling or disabling of the gates 203, 204 and 205. Thus, if the flip flop 181 contains a one and the flip flop 191 contains a one, whenever a timing pulse appears on line 214, gate 203 is opened to pass an output pulse to the NOR gate 206. The output of the gate 206 is inverted by the amplifier 211 and a signal appears on line 215. Whenever the flip flop 182 contains a one and the flip flop 191 is in the one state and a pulse appears on line 214, the gate 204 is opened to pass a pulse through the NOR gate 207. The output of the NOR gate 207 is inverted by the amplifier 212 to apply a signal to the line 216. Similarly, when flip flop 183 is in the one state and flip flop 191 is in the one state and a clock pulse appears on the line 214, gate 205 provides an output which is applied to line 217. The information on line 215, 216 and 217 is utilized to determine the intensity at which the target will appear on the screen of the displays 23 and 24. When the flip flops 181, 182 and 183 are all in the one state, then the gate 201 is enabled and provides an output pulse which enables gate 202. The other input to gate 202 comes from gate 198. When flip flop 192 of the shift register 180 is in the one state, and also when flip flop 171 is in the one state, gate 198 is opened to pass an output signal to open gate 202. Under these conditions, 202 provides an output pulse which is passed through the NOR gates 206 and 207. This puts a signal on each of the two lines 215 and 216 to provide intensity for the target in question. The described operation actually extends the time during which the intensity information is provided to identify a larger target or a close one. Since each clock pulse causes one of the flip flops 191, 192 and 188 to change from the one state to the zero state, in sequence, the gates 203, 204 and 205 will have an enabling pulse from the flip flop 191 for only one clock pulse tiime. After that one clock pulse time, flip flop 191 changes its state and removes the enabling pulse from those gates. This is the time period during which a target is normally shown on the displays 23 and 24. However, when a target is a large one to occupy two spaces on the displays or when the target is quite close, then the information provided from the computer will be a string of ones which will be entered into the shift register 170. Since the timing of the shift register 180 is such as to prevent a continuous display of a target for more than the time required to decode the three intensity pulses, the second gate 202 is provided to pass signals through the NOR gates 206 and 207 should the conditions mentioned above be met. Thus, so long as a one exists in the flip flop 171, the flip flop 192, which remains in its one state during two pulse times, together with the one condition of the flip flop 171, enables gate 198 to open gate 202 for a second pulse time.

FIGS. 2F and 2G illustrate the control buffer 31 and the control unit 32. In FIG. 2F, lines 221 are the computer output lines from the control and address buses 14 and 15 of the computer 11. The lines 221 are connected to the inputs of buffers 222, 223, 227, etc., which may be any normal buffers readily available which will perform the decoupling function satisfactorily. The buffer 222 has its output applied through an inverter driver 224 to the input of gate 235. The buffer 223 applies its output through an inverter driver 225 to an input of a NOR gate 303 (FIG. 2G), and through a second inverter driver 226 to one input of a gate 271, through an inverter driver 233 to an input of a NOR gate 236, and an input of a gate 300 (FIG. 2G). The output of the buffer 227 is applied through an inverter driver 229 to the other input of the NOR gate 303, and through a second inverter driver 228 to an input of a gate 269, through another inverter driver 232 to an input of the NOR gate 236, and to one input of each of gates 295, 297 and 299 (FIG. 2G). Buffer 238 has a single output which is applied through an inverter driver 239 to one input of gate 231, one input of gate 268, one input to gate 285 and one input of gate 296. Similarly, the buffer 241 has its output applied through an inverter driver 253 to one input of gate 266, and one input of gate 272. The output of buffer 242 is connected through an inverter driver 254 to one input to gate 266 and one input of gate 272. From buffer 243, the information from the computer 11 is passed through an inverter driver 255 to the inputs of gates 266 and 272. Also connected to the inputs of gates 266 and 272 are the outputs from the buffer 244 through an inverter driver 256, and from buffer 245 through an inverter driver 257. Buffer 246 applies its output through an inverter driver 259 to an input of the gate 266, and through another inverter driver 258 to an input of the gate 272. The output from buffer 247 is applied through an inverter driver 261 to the inputs to gates 285, 295, 296 and 297. Similarly, the output of buffer 248 is applied through an inverter driver 262 to the inputs of gates 298, 300, 301 and 302. Buffer 249 is connected through an inverter driver 263 to an input of gate 286, and the output of buffer 251 is applied through an inverter driver 264 to an input of each of NOR gates 287 and 288. The buffer 252 applies its output through an inverter driver 265 to other inputs of the NOR gates 287 and 288. The output from gate 231 is connected to an input of the NOR gate 236, whose output is connected to one input to gate 237. The output from the gate 237 is applied to the base electrode of a transistor 283 which is in cascade with a second transistor 284, both transistors together forming an input buffer 12 to the computer 11. The output from the gate 235 provided another input to the NOR gate 236. The gate 266 has six inputs but a single output, which is applied through an inverter driver 267 to the inputs of gates 237, 285 and 295. The output from the gates 268, 269 and 271 are applied as inputs to the OR gate 273, whose output is applied as one input to gate 274, the output of which is applied to the base electrode of another input buffer 12 similar to that described above. Gate 272 also has six inputs but a single output which is applied through an inverter driver 275 to the inputs of gates 274, 296, 297 and 302. The signal on terminal 281 comes from terminal 281 of the output buffers shown on FIG. 2A and is applied to an input of a gate 286, the output of which is applied as an input of a flip flop 293. The other input to the flip flop 293 is derived from the NOR gate 288 through an inverter driver 291, and one output of the flip flop 293 is applied as an input both to flip flops 292 and to gate 294, while the other output is applied as another input to a flip flop 292. The third input to the flip flop 292 comes from a NOR gate 287 through an inverter driver 289. One input to the NOR gate 287 comes from the output of the gate 285. One output from the flip flop 292 is applied to the gate 294 and the other output is applied to the input of gate 231.

The fifteen buffers shown in FIG. 2F; 222, 223, 227, 238, 241–249, 251 and 252, represent the fifteen outputs from the address and control buses in the computer 11. The various gates shown together with the connections among the gates and buffers, decode the information contained on these fifteen lines to provide the computer 11 with control of many of the functions of the system. The decoding of the addresses is shown in later drawings and will be described at a later time. However, the information contained on the fifteen output lines 221 of the computer are combined in the several gates to provide control of many circuits and operations. For example, the information contained on the top line 221 and applied to the buffer 222 is applied through the inverter driver 224 as an enabling signal to gates 235, 298 and 302, and is applied through another inverter and the NOR gate 273 as an enabling signal on gates 274. Thus, a signal on the input lines 221 to the buffer 222 may apply a signal which passes through one or more of the mentioned gates. The same is true of the other lines 221 from the computer 11. Some combinations of information result in information being applied to the input buffer to be fed back into the computer 11 such as the output from the gates 237 and 274. An output results from gate 237 when a suitable signal passes through the NOR gate 236, and the gate 266 generates an output. A signal can pass through the NOR gate 236 whenever there is a pulse from buffers 223 or 227, but it requires the simultaneous energization of six inputs for the gate 266 to generate an output. If the buffers 241, 242, 243, 244, 245 and 246 all have a pulse applied to them, and, at the same time, there appears a pulse on either or both of the buffers 223 and 227, then both inputs to the gate 237 will be low, and a signal will be applied to the base electrode of the transistor 283 for transmission through the transistor 284 to an input line of the computer 11. There are other combinations of information which will pass information to the two input buffers 12, of course. In addition to applying information to the input of the computer 11, combinations of signals applied to the fifteen control buffers cause one or more of the gates 285, 286 and 295–303 to conduct signals for application to other portions of this system.

When the computer 11 is ready to supply information to the output interface 17 to update the displays, the equipment must be in condition to receive this information Therefore, various combinations of signals are necessary to indicate that the apparatus is in condition to perform the required operation. The outputs from the gates 237 and 274 are those ready signals and are applied to the computer 11 through the input buffers 12, as mentioned above. In addition, the control unit 32 generates several of the control signals used in the system. For example, the computer 11 in its normal operation will, at appropriate times in a computation, try to transfer information into the registers 111 and 116 in the output interface 17 shown on FIGS. 2A and 2B. To accomplish this, the control unit 32 generates a transfer or loading pulse in gate 298. Gate 298 receives three input signals at once to accomplish this, two of the input signals being applied from the address lines 7 and 10 and the third from the control line applied to buffer 248. The address lines 7 and 10 are applied to buffers 222 and 238 respectively. The computer 11 signals its readiness to transfer information to the registers by energizing these three lines simultaneously. This function is accomplished by programming. The output from the gate 298 is applied through line 114 to the transfer or clock input to the register 116, or, as shown better in FIG. 2A, to gates 112 and 113 to open these gates and provide each of the flip flops in the registers with the transfer signal. In a similar manner, flip flop 292 generates a real time clock signal which is used to control the interruption of the computations being performed by the computer 11 to enable the transfer of information from the computer 11 to the output interface 17. This occurs periodically at time intervals sufficient to accomplish all of the necessary functions. The operation is enabled to interrupt the computations by the generation of a signal in the flip flop 293, and the interrupt itself is accomplished by the signal generated in gate 294. As indicated later in the description of the apparatus, the radar display devices utilize an address counter shown in FIG. 2H to maintain a record of the position of the radial sweep at any time. This address counter is reset by the signal generated in gate 295, and it is advanced by the signal generated by gate 301. In addition, the radar antenna simulator 25 generates signals when it is at zero degrees and for each one degree of its rotation. The signal generated in gate 297 resets the zero degree flip flop, and the signal generated in gate 296 resets the one degree flip flop. These are examples of how the control unit 32 receives information from several of the computer output lines and generates signals for controlling the operation of the system by combining several of these computer signals in predetermined combinations. Of course, the generation of the proper signals on the computer output lines must be accomplished by proper programming of the computer 11 itself.

Two of the important aspects of the device of this invention from a training point of view are the ability to control the operation of the system from an instructor station and control panels and also to display information such as speed, direction, position, etc. to both the instructor and the trainee, either on demand or automatically. In brief, the instructor station 36 comprises a plurality of switches by means of which the instructor can manually insert into the computer program prescribed initial conditions. Since a digital computer is used in this system, the information is inserted by the instructor by selecting one of a plurality of lines for each piece of information. Thus, consider the maximum speed of the ship. Assuming that the trainee is given the control of speed by the selection of such speeds as ahead or back, full, ½ slow, or dead slow, then the maximum speed specified by the instructor determines the actual simulated speed in knots at any of these speed positions selected by the trainee. The instructor can have as choices, for example, maximum speeds of 15, 20, 25 or 30 knots. By setting his selector switch at the desired setting, this information, and similar other information, can be entered into the computer for the computations required. To maintain simplicity in the construction and operation of the apparatus, the information inserted into the computer by the instructor and the trainee is programmed into a specific pattern or sequence which is always followed. In this manner, the type of information (speed, heading, position, etc.) is identified by the position it occupies in the sequence. To maintain the proper sequence and operation, an address counter is used to read the various switches in the proper order. In FIG. 2H, the address counter is identified by the reference character 310, and it comprises flip flops 313, 314, 315 and 316. The stepping input to the counter 310 is applied to line 312 from the control unit 32 as discussed above. The counter reset pulse is applied from the control unit 32 through line 311, and through an inverter 317 to the zero inputs of the flip flops 313–316. The counter decoder comprises a plurality of gates 321, 322, 323, 324, 325, 326, 327 and 328. Each of the gates 321–328 has three inputs which are connected to combinations of the zero and one outputs of the flip flops 313–316. The one output from flip flop 313 is applied to one input of each of gates 321, 323,

325 and 327, and the zero output from the flip flop 313 is connected to one input of each of gates 322, 324, 326 and 328. Similarly, the outputs from the flip flops are connected to the gates as shown in the table below.

| Flip flop | Output | Gate |
|---|---|---|
| 313 | 1 | 321, 323, 325, 327 |
| 313 | 0 | 322, 324, 326, 328 |
| 314 | 1 | 321, 322, 325, 326 |
| 314 | 0 | 323, 324, 327, 328 |
| 315 | 1 | 321, 322, 323, 324 |
| 315 | 0 | 325, 326, 327, 328 |

When any of the gates 321–328 has three input signals applied simultaneously to it, it generates an output signal which passes through the appropriate one of inverter drivers 344, 345, 346, 347, 348, 349, 350 and 351. Each of a second bank of gates 331, 332, 333, 334, 335, 336, 337, 338, 339, 340, 341, 342 and 343 has two inputs applied to it, one input to all of gates 331, 332, 333, 334, 335, 336, 337 and 338 is connected to the zero output of the flip flop 316, and one input to all of gates 339, 340, 341, 342 and 343 is connected to the one output of flip flop 316. The second input to gate 331 comes from inverter 344, that to gate 332 from inverter 345, that to gate 333 from inverter 346, that to gate 334 from inverter 347, that to gate 335 from inverter 348, that to gate 336 from inverter 349, that to gate 337 from inverter 350 and that to gate 338 from inverter 351. The second input to gate 339 comes from inverter 344, to gate 340 from inverter 345, to gate 341 from inverter 346, to gate 342 from inverter 347 and to gate 343 from inverter 348.

In operation, the counter 310 is first cleared to all zeros by the application of a pulse on the line 311 from the control unit. This signal is generated in gate 295 of FIG. 2G by the coincident occurrence of signals on the buffer 247, the buffer 227, and all of buffers 241–246. Once the counter 310 has been cleared to zero, each subsequent pulse generated in gate 301 steps the counter one count. The stepping signal is generated in gate 301 whenever there is the coincident energization of buffer 248, either of buffers 223 or 227, and all of the buffers 241–246. The application of the stepping pulse to flip flop 313 through line 312 causes that flip flop to change its state. Each subsequent pulse applied to the input of flip flop 313 causes a change in state of that flip flop, and these changes are passed down the counter 310 in the manner of any binary counter. At any instant, the combination of the outputs from the counter 310 energizes one of the gates 321–328. Suppose, for an example, that flip flop 313 is in the one state, flip flop 314 is in the zero state, 315 is in the one state, and 316 is in the zero state. Referring to the table given above, the only gate which has all three inputs energized under these conditions is gate 323. The output of gate 323 is applied through the inverter 346 to one input of the gate 333 and of the gate 341. Since the flip flop 316 was specified as being in the zero state, the gate 333 is opened, and a signal applied to its output terminal 352. The output lines of the gates 331–343 are connected to the instructor station, one line to the movable contacts of each rotary switch at the instructor station, and to the two control panels, one line to each of the two switches on each panel. As illustrative of the switching arrangements provided in a system of this type, one bank of three rotary switch decks have been shown in FIG. 2P. The three decks are identified by characters 353, 354 and 355. Each deck carries a rotary contact 356, 357 and 358 respectively, and a number of stationary contacts, only some of which are used at any time. The rotary contacts 356, 357 and 358 are all connected to an input terminal 352, which is the output terminal for the gate 333. On deck 353, contacts 361, 362, 363 and 364 are connected together and to a terminal 376. On deck 354, contacts 365, 366, 367 and 368 are connected together and to a terminal 377. And on deck 355, contacts 371, 372, 373 and 374 are connected together and to a terminal 378, and contact 375 is connected to a terminal 379. The terminal 376 is connected to its contacts through a diode 381, the terminal 377 is connected to its contacts through a diode 382, the terminal 378 is connected to its contacts through a diode 383, and the contact 379 is connected to terminal 375 through a diode 384. The three decks shown in FIG. 2P comprise a single switch, in this case the speed control switch on the control panel 34 for ship #1, which is manually set by the trainee.

For this discussion, assume that the trainee has set the rotatable contacts 356, 357 and 358, which are mechanically ganged to move together, at one o'clock, Ahead-Dead Slow. When gate 333 is energized, a pulse passes through it to the terminal 352. The terminal 352 is connected to the three movable contacts 354–356, so the pulse is then applied to the contacts 363 and 372. Since the contact 363 is connected to terminal 376, and the contact 372 is connected to the terminal 378, the pulse is applied to these terminals and appears at the same terminals on FIG. 2I. Only one switch is shown on FIG. 2P to avoid cluttering the drawings even more than they are now. For the same reason, the interconnections between the switch and the rest of the circuitry are not shown, but the connecting terminals bear the same numbers. The switching arrangement shown is but exemplary. It should be clear that as many switches as desired can be provided, each switch adding another parameter to the system. But, it must also be borne in mind that whatever variable information is added by the way of switches increases the complexity of the circuitry and the time required for scanning the switches. As indicated above, the scanning of the switches is performed by the counter 310 of FIG. 2H. As the counter 310 has input pulses applied to it along line 312, the flip flops 313–316 change condition in a normal binary sequence. Thus, flip-flop 313 is changed to the one state, and when it is returned to the zero state on the next pulse, flip flop 314 is placed in the one condition. Two more pulses on line 312 place flip flop 313 in the one state again, and then in the zero state, the last change placing flip flop 314 back in the zero state and putting flip flop 315 in the one state. As the counting proceeds, the individual gate 321–328 which is opened changes to apply pulses to the various switches to which the individual gates are connected, in sequence. Since this sequence is fixed, the information applied to the computer 11 is in a fixed order, and the information need not be otherwise identified.

The contacts of the switches are connected by means of terminals, such as terminals 376, 377, 378 and 379, to input lines of the input buffer 27, which is shown in FIG. 2I. Since all of the input buffers are the same, only a few will be described. The output terminals from the switch decks 353, 354 and 356 are 376, 377, 378 and 379. These are four of the input terminals of the input buffer 27. Remember, the input buffer supplies the inputs to the computer 11. The terminal 376 is connected as one input to a gate 385, the terminal 377 is one input to a gate 386, the terminal 378 is one input to a gate 387 and the terminal 379 is one input to the gate 388. The second input to each of these gates 385–388 is applied to line 389 from the output of gate 299 on FIG. 2G. This is the input enable line which carries the signal causing the gates in the input buffer 27 to open and pass information to the computer 11. The outputs of the gates are applied to transistors. The output of gate 385 is connected to the base electrode of a transistor 393 which is connected in cascade with a transistor 394. The output from transistor 394 is applied to one of the computer input lines 401. The output of gate 386 is applied through transistors 395 and 396 in cascade to a computer input line 402, and the output of gate 387 is applied through transistors 397 and 398 in cascade to the computer input line 403. Since all of the remaining input buffer stages are the same as those shown, they are not further described. In fact, the remaining transistors are not even shown for greater simplicity.

Part of the input interface 26 is shown in FIG. 2J. As mentioned above, the antenna simulator includes synchronous generators which provide controlling signals for the motors driving the deflection yokes of the individual radar sets. However, the computer requires timing signals which represent each segment of rotation during which new information is required. If it is assumed, for this discussion, that the width of the antenna beam in the radar displays is two degrees or more, then it is necessary to supply new information to the radar sets no more often than each degree of rotation. The information available is presented to the output buffer for each radar sweep. Using the above assumption, this sweep information must be updated once each degree. Assuming six seconds for one complete rotation of the antenna, the antenna would move through one degree in $6/360=1/60$ second. Thus, once each sixtieth of a second, new, updated information is applied to the output buffer. During the remaining time, the computer is computing the changes caused by the movement of the ships, the changes in heading introduced by the trainees, and the like, and is updating the information for the degree. The counter which provides the computer 11 with the mentioned timing information is the counter 405 shown in FIG. 2J. The counter 405 comprises a series of binary counters 407, 408, 409, 410, 411, 412, 413, 414, 415, 416, 417, 418 and 419 connected in cascade. The input to the counter 405 is applied along line 406 from binary counter stage 134 of the clock shown in FIG. 2D. The pulse output from the counter stage 134 of the clock is much higher than 60 cycles per second, which is what is required for the proper timing of the antenna simulator and the radial sweep, so the counter 405 receives the input pulses from the clock and counts down through the stages 407–419 to produce the timing signals of the proper frequency. The zero output from counter stage 419 is applied as an input to a gate 425 along with the one output from the stage 413 and the output from a one-shot multivibrator 428. The output from the gate 425 is applied to a one-shot multivibrator 426, whose output is applied to an input of a one-degree flip flop 427. The one output from the flip flop 427 is applied along line 423 to an input of gate 268 is the control unit shown in FIG. 2F. Gate 268 generates one of the signals which provides an indication that the equipment is ready for a transfer of information. The one-shot multivibrator 428 receives its input from the antenna simulator 25 along line 432. In addition to supplying a signal to the gate 425, the one-shot 428 also supplies a signal to a flip flop 429, to set that flip flop. The output of the flip flop 429 is applied along line 424 to an input of gate 269 in FIG. 2F. Gate 269 is another of the gates which supplies signals to generate the ready signal. The outputs from the two one-shots 426 and 428 are applied as inputs to a NOR gate 431, the output from which is applied as a clear pulse to the counter stages 407–419.

As indicated, the input to the counter 405 is from the clock 18. The counter stage 407 receives each of the pulses from the clock 18, and each time it receives a clock pulse it changes its condition. For each two changes in the condition of stage 407, stage 408 changes its condition. This action proceeds as a ripple through the counter 405. When stage 413 is in its one state and stage 419 is in its one state, and when the one-shot 428 is in its stable condition, gate 425 is open and a pulse is applied to the one-shot 426 to set it to its unstable state. This pulses the flip flop 427, placing it in its one state and applying a signal to the line 423 for application to the input of the gate 268. When the one-shot 426 recovers, it applies a signal through the NOR gate 431 to clear the counter 405 to zeros. The flip flop 427 is restored to its zero condition when a pulse appears on the line 421 from the output of gate 296 in FIG. 2G. In this manner, a signal is applied to the control unit each one sixtieth of a second to aid in generating a transfer signal for transfering information from the computer. To avoid the possibility of a loss of synchronism between the antenna simulator and the interface equipment, each rotation of the simulated antenna produces a pulse at zero degrees. This pulse is applied through line 432 to the input of the one-shot 428 to set that one-shot into its unstable condition. This inhibits gate 425 and sets the flip flop 429 to its one condition. The one condition of the flip flop 429 applies a signal along line 424 to the input of gate 269 in FIG. 2F to generate the ready signal. At the same time, the output from the one-shot 428 applies a pulse through the NOR gate 431 to clear the counter 405 to zero. Thus, when the antenna reaches zero degrees, the counter operation is synchronized with it. The zero flip flop 429 is restored to its zero state by a pulse on line 422 from gate 297 in FIG. 2G.

The instructor station 36 and both of the control panels 34 and 35 include readout devices for displaying information pertinent to the location, speed, etc. of each of the ships being simulated and shown on the radar displays. This information is made available to the instructor to enable him to observe the running of the training problem, and to the trainees to indicate to them the operation of their own ships. In a system of this type which has been constructed, each ship control panel included digital display devices which indicated the simulated speed of the respective ship and the heading of that ship. The instructor station also contained digital display devices which could be connected, by means of selector switches, to indicate the heading of each of the simulated ships and of the target ships displayed on the radar screens, the locations of the buoys inserted into the problem, the speed of each of the ships and target, ships, the relative bearing of any pair of ships, and the like. Of course, the information which is displayed at any location may be any information which is available from the computer. As this information is updated by the recomputation performed in the computer, it is read out of the computer and transferred to storage registers in the output interface. The information is then available for transmission to the digital display devices whenever it is desired. Examples of the storage registers in the output interface are shown in FIGS. 2K and 21.

FIG. 2K shows, in some detail, a single register which comprises flip flops (ten in number) 452. Each flip flop 452 has an input signal applied to it from one of the terminals 441, 442, 443, 444, 445, 446, 447, 448, 449 and 450 through inverter drivers 451. The information applied to the terminals 441–450 comes from the terminals 441–450 of the output buffer 16 shown in FIGS. 2A and 2B. A gate 453 is connected to all of the flip flops 452, and has three inputs. One input is applied from the one output of flip flop 316 shown in FIG. 2H through line 455. Another input is applied to gate 453 from gate 300 shown in FIG. 2G along line 454. And the third input to gate 453 comes from gate 321, shown in FIG. 2H along line 456. FIG. 2L shows seven additional registers in block form. Each of the registers 457, 458, 459, 460, 461, 462 and 463 has its inputs connected to the input buffers as indicated above with respect to the register 440. To avoid the unnecessary clutter of additional lines drawn across the face of many of the sheets of drawings, the inputs have been labeled with the same reference characters as those terminals in FIGS. 2A and 2B to which they are connected. The application of information to the individual register is controlled by a gate 453 for each register. Each gate 453 has three inputs connected to it. Two of the input lines 454 and 455 are the same for all gates 453, but the third line is different for each register. Each of the lines 464, 465, 466, 468, 469 and 471 is individually connected to the output of a different one of the gates 321–328 of the address counter shown in FIG. 2H.

In operation, when information appears at the output buffer 16 and the gate 300 in the control unit is opened, and the flip flop 316 in address counter 310 is in the one state, gate 453 in FIG. 2K is opened to let the information on the lines 441–450 load the register 440. The outputs from the flip flops 452 which comprise the register 440 are applied to one of the digital displays of the instructor station 36. The digital displays are not shown, nor are the selector switches which control them, to avoid unnecessary description and drawings. The individual decoders for the digital displays are incorporated in the display devices themselves. Once the register 440 is loaded, the information contained therein is available for continual display at the instructor station. When the information for the register 440 is updated, and there are changes in the information, the changes are again loaded into the register when the gate 453 opens. Each of the registers 457–463 shown on FIG. 2L operate same as the register 440 except that their outputs are connected to different digital displays. In fact, the input lines are usually identical for them all. However, since one input to the individual gates 453 is unique to each register, the register is loaded only when its time comes to be loaded. The timing is accomplished by the address counter and decoder of FIG. 2H. As the count in the counter changes, the gates 321–328 are individually opened in sequence. This, in turn, causes the individual gates 453 to open in sequence so that only one register 457–463 receives information at any time. The updating occurs periodically during the operation of the computer. At this point it can be noted that, in the address decoder 33 in FIG. 2H, there are really two decoders. The gates 331–343 decode the addresses to sequentially scan the switches which supply information from the two ship control panels 34 and 35 and from the instructor station 36, and the gates 321–328 decode the addresses to sequentially scan the registers 440 and 457–463 which supply information to the control panels 34 and 35 and the instructor station 36. In one case the information goes to the computer 11, and in the other case the information comes from the registers 440 and 457–463.

FIG. 2M shows a miscellaneous signal generator 19 which provides the system with special effects. Since the special signals generated by the generator 19 vary with each installation and with the requirements of each training activity, the special effects described herein are exemplary only. It will be understood that any additional types of signal can also be generated by similar equipment. One of the effects generated is the simulation of the radar marker. As mentioned above, the marker is the bright line in the display which is produced by the energization of the radar beam for that entire radial sweep which represents the ship heading. The markers for the two simulated ships are generated by two separate one-shot multivibrators 491 and 492 shown on FIG. 2M. A gate 487 has its single output connected to the input of the one-shot 491. The two inputs to the gate 487 are applied from the terminal 281 on FIG. 2A which is the output of one of the output buffers 102, and by the line 486 from the output of the gate 302 in FIG. 2G. The output of the gate 302 is a pulse which initiates the marker signal. Similarly, the input to the one-shot 492 is applied from the output of a gate 488 whose two inputs come from the line 486 and a terminal 493 connected to one output from an output buffer 102 on FIG. 2A. Thus, when the appropriate signals are present at the output buffers 102 and also from the gate 302 in the control unit, the one-shots 491 and 492 are individually placed into their unstable states. So long as the one-shots remain in their unstable states, the cathode beams in the radar displays are turned on. The set time of the one-shots 491 and 492 are selected to correspond to the length of time of a single radial sweep in the radar displays.

In the example presented above, the outputs of the one-shots 491 and 492 are applied directly as video signals to the radar sets. However, in most cases, the special effects modify the video signals generated elsewhere. FIG. 2N illustrates some of the circuits for generating the video signals used to control the radar sets. Remembering an earlier statement that the equipment described herein serves to convert the information output from the computer 11 into language which is utilized by the radar sets 23 and 24, the video information applied to the radar sets should be indicated. The radar signals can be considered to be of several different types. The sweep signals are one type, and these are generated locally for each set. In addition, the sweep yokes are synchronized with the antenna to rotate therewith so that as the antenna rotates to sweep an area, the radial sweep also rotates to display the same area. In both cases, the rotation is performed about the position of the radar antenna as a center. Another form of signal are the control signals such as gain, contrast, etc. These may modify the potentials applied to the cathode ray tube, or they may modify the amplitude of the information signals. The third type of radar signals are the radar information, or video signals. The video signals are those which represent the received, reflected pulses and they are used to control the intensity of the cathode beam. When no radar signal pulses are reflected and received by the receiver, then the display screen is dark. When the antenna sweeps an area where a target reflects the radar pulse, the reflected pulse is received and turns on the cathode beam to an intensity which is proportional to the strength of the recived reflected pulse. Since the cathode beam is sweeping in synchronism with the radar antenna beam, the point where the display screen shows the reception of a returned pulse by a light spot indicates the relative position of the object which reflected the pulse with respect to the antenna. The center of the display screen represents the position of the antenna, and the position of the light spot on the screen locates the reflecting object with respect to the antenna. Large objects reflect more energy than small objects. Similarly, some materials reflect radar pulses better than others. For this reason, the strength of the received signals will vary for reasons other than the distance they had to travel. As the radar antenna rotates, there may be areas from which no reflected signals will ever be received. One such area is that segment of the radar transmission which is intercepted by tall objects on the ship itself, for example. The funnel of the ship is one such object. As the antenna rotates it passes the funnel for a short time. Since the funnel is in the way of the transmitted pulses, no reflected pulses will be received while the antenna is behind the funnel. To simulate this phenomena in this equipment, a shadow signal is generated. On FIG. 2M, two flip flops 475 and 476 are shown. The input to the flip flop 475 is applied from a terminal 477 which is connected to a similarly identified terminal on FIG. 2A representing an output of one of the output buffers 102. The other input is applied from a terminal 478, also connected to an output of one of the output buffers 102. The control signals are applied to the flip flops 475 and 476 along the line 486 which is connected to the output of the gate 302 in the control unit. The inputs to the flip flop 476 are from the terminals 479 and 481 which are also connected to the output of one of the output buffers shown on FIG. 2A. The two flip flops 475 and 476 individually control the shadows for the two separate ships being simulated. When the flip flop 475 receives signals from line 486 and the terminal 477, it is placed into the one state to produce an output signal which is applied along line 482 to control the operation of an operational amplifier 484, shown in FIG. 2N. The operational amplifier 484 transmits the video information to the radar display device 24 which represents that of one of the simulated ships. When the operational amplifier 484 receives an output signal from the flip flop 475, it is cut off, preventing the passage of video information through it. Thus, for the time that the flip flop 475 is in the one state, no targets are displayed on the screen of the display device 24. When sufficient time has passed to represent the emergence of the radar antenna beam from behind the funnel, a signal is applied to the terminal 479 by the computer 11, and the flip flop 475 is returned to its zero condition, removing the inhibiting signal from the operational amplifier 484. The circuit for the other display device 23 operates in the same manner.

The video information generation is shown on FIG. 2N. Information comes from the computer 11 through the registers shown on FIG. 2C, and is applied along the lines 215, 216 and 217 from the outputs of the gates 203, 204 and 205, respectively, to amplifiers 504, 505 and 506, respectively, on FIG. 2N. The outputs from the amplifiers 504, 505 and 506 are added together in a resistor adder 507 to produce a potential which is proportional to the strength of the signal indicated by the three bit intensity code. The outputs from the amplifiers 504-507 are applied to the adder 506 through resistors having scaled values so that a pulse from the gate 205 along line 217 is attenuated more than a pulse from gate 203 along line 215. Thereby the information from the computer 11 which represents intensity of a target by combinations of digits is converted into amplitude information representing the same thing. The amplitude information from the adder 507 is then applied to a mixer 509 where the intensity information is combined with information from other sources. For example, simulated sea clutter may be generated in the computer 11 or it may be generated by additional circuitry. In FIG. 2N, a noise generator 511 generates random noise signals representative of sea clutter, which signals are applied to a mixer 512 wherein it is combined with clock pulses from gates 164 and 165 along lines 518 and 519. The clock pulses are applied to a NOR gate 521, from which they pass through a sensitivity time control circuit 522 to the mixer 512. The sensitivity time control circuit 522 receives the clock pulses and converts them into a signal which has an initial low amplitude which rises exponentially with time. The time is the time of one sweep. In this manner, the gain of a system or component, for example, can be controlled to be low close into the center, and then gradually rise as the sweep progresses to reduce the effects of signals such as sea clutter. In this case, the sea clutter dominates the mixer 512 at the beginning of the sweep, but as the effect of the clock pulse rises due to the sensitivity time control circuit 522, the effect of the sea clutter is reduced, until the rising clock pulse dominates the mixer 512. The resulting signal from the mixer 512 is combined in the mixer 509 with the intensity of the target, and the composite signal is applied to a second sensitivity time control circuit 513. The effect of the circuit 513 is determined by the value of a gain signal applied from the set gain control, not shown, which can be manually adjusted by the operator. The mixer 514 also has applied to it a composite signal which is formed by a second noise generator 495 which simulates radar receiver noise. The noise signal is differentiated in a differentiator 496 and applied to a mixer 497 which also has applied to it the output from a sensitivity time control circuit 498 under the control of the gain control for the radar set 23 for ship number 2. The output from the mixer 497 is applied through an amplifier to the display for ship number 2. The input to the mixer 514 is from the output of the differentiator 496 also, and the output from the mixer 514 is applied as video to the display 24 for the ship number 1. Thus, both of the ships display devices 23 and 24 receive the same signals other than the information from the computer. The noise which represents sea clutter is applied to both display devices through the respective mixers, and the noise which represents receiver noise is also applied to both through the mixers. In addition, the time variations in the radar sets which are used to vary the gain with sweep to reduce the effects of noise are also included. The information from the computer 11 is converted, as explained above, into video information in the adder 507, and this information is combined with the other video information generated in the circuitry shown in FIG. 2N for application to the two radar display devices 23 and 24. However, the video output from the mixer 514 is applied to the input of an operational amplifier 484, and the gain of the amplifier 484 is controlled, at least in part, by the shadow signals mentioned above. The output from the mixer 497 is similarly applied to an operational amplifier 485 whose gain is controlled by the shadow also.

The antenna simulator has been mentioned several times in the description of the operation of this system. An antenna simulator may assume any of many different forms. One of these forms is shown in FIG. 2P. A synchronous motor 531 is energized from a source of commercial power through a normal power switch. The motor 531 drives a gear box 532 to which is attached one side of a clutch 533, the other side of which is connected to several devices. The driven side of clutch 533 is connected to two synchronous generators 534 and 535, to a rotary switch 536, and to a dial and pointer 537. The synchronous generators provide synchronizing signals for the motors driving the yokes in the sweeps of the two radar displays 23 and 24. The switch 536 provides an electrical indication when the antenna simulator approaches zero degrees. Should one of the yokes be out of phase with the antenna simulator, the pulse output from the switch 536 shorts the out-of-phase motor and locks it immovable at zero until the antenna again reaches zero. When all are at zero degrees, the output from the switch 536 releases the frozen motor, and the apparatus proceeds in its operation. The dial and pointer 537 provides a visual indication of the position of the antenna equipment at any time. In addition, a pulse is applied to the computer 11 to synchronize it with the other equipment when the antenna reaches zero. This pulse may be generated by the switch 536 or by another switch provided for this purpose.

SUMMARY

Probably the best way to present a summary is to describe broadly one system which was constructed and tested. A high-speed, general purpose computer was used because it was readily available and inexpensive. This computer has a sixteen bit word size, is binary in operation, and manipulates the sixteen bits in the word in parallel for speed. The computer has bus lines for reading digital information into the computer, for reading digital information out of the computer, and for external control purposes. Since the computer word is presented in parallel, the interface equipment included parallel buffers in two banks of registers connected to the buffers. The first bank received a word at a time, and then transferred that word into the second bank. In the second bank, the word is shifted toward one end where a single bit at a time is made available for subsequent use. The shifting is taken place, a new word is inserted into the first bank. As the digital information reaches the output of the second bank of registers, it is applied to a small shift register. In this case, a single target is represented in binary form by four bits, the first bit being a gating bit which indicates a target to be shown on the radar screen, and the subsequent three bits representing the intensity of the target. By this means, eight levels of target intensity can be achieved. The digital information is applied to the small shift register bit-by-bit. In this device, the shift register comprises four flip flops to represent a single target at any time. A single radial sweep of the cathode beam represents 252 possible target locations, and requires 63 sixteen bit words. To enable better resolution of the target location on any line, the digital information from the computer is looked at in the small shift register in groups of four, without regard for whether or not any group of four represents an even target location or not. Thus, a group of four bits could occupy bit positions 10, 11, 12 and 13 in a sweep, and is not restricted to only the bit positions 1–4, 5–8, 9–12, etc. When a pulse is shifted into the fourth flip flop of the shift register, the output from that flip flop applies gating signals to the input gates of three other flip flops to apply the following three bits of information to them. The outputs from these three other flip flops are connected to a small matrix of gates for decoding the outputs from the three flip flops into the energization of any combination of three output lines. The three lines are connected together through scaling resistors having predetermined relative values to produce a single potential which is proportional to the value represented by the digital information. This potential then is applied as a video signal to the cathode or grid of the cathode ray tube to control the beam intensity. Since the potential is really only a pulse, turns the cathode beam on to a predetermined strength for a short time and at a specific location depending upon when the information was supplied from the computer.

When operating the system, the antenna simulator is turned on first. Then, when the computer receives its first zero synchronizing signal from the antenna, it begins computing the position of the information to be released to the interface. This computation continues through the first sweep of the antenna, which occupies about six seconds, and when the antenna again passes through zero, information is applied from the computer to the interface for display on the cathode ray tube. During this first sweep, the deflection yokes are zeroed with the antenna also. Initially, the computer memory was filled with information representing the land mass and other targets in a particular geographic location such as a harbor. The information in the computer memory is stored in a prescribed order which is related to a designated origin. The target information is arranged in rectangular coordinates or in longitudinal-latitude relation. However, the display on the cathode ray tube is in polar coordinates, so the computer must convert the information from one coordinate system to the other. In addition, the computer must determine from information applied manually at the beginning of the problem which portion of all of the information stored in the memory is being displayed at any time. The center of the cathode ray tube screen is thus located with respect to the stored information. As the information is drawn from the memory and processed in the computer, it is arranged in the order in which it is to be applied to the interface. The computer must continually modify the information which is being applied to the interface by moving particular words along in one direction or another as the training mission proceeds. Once the initial display is presented, the simulated ship is centered on the screen. Then, as the ship moves (simulated movement, of course), the coast line and other fixed targets must be shown slipping by. Thus, the computer determines from the data presented to it what the position of each target representation will be on the next sweep. The location is determined by the simulated ship speed and direction, as well as the velocity of sea currents, etc. The stored information is not modified—the order of presentation is modified. Thus, if a pair of buoys is shown, the two individual buoys will always be the same distance apart and in the same direction with respect to north, but the position of the pair on the screen will change. This can be accomplished by relating all of the information to zero degrees at the beginning of the first radar antenna and cathode beam sweep.

It is often desirable to present selective information on the radar screen. In training navigators, ship pilots, and the like, the presence of other moving bodies such as other ships in the area is desirable. Therefore, it is possible to supply the computer with information relating to other moving targets. The initial position and speed of the moving target as well as its direction is supplied as auxiliary information to the computer, and this is used to add targets to those permanently stored in the memory. These additional targets have their positions recalculated separately because they move at different rates and in different directions from the other targets. But the process is the same.

Since a computer is being used and it is capable of other types of computations also, if there is computer time available, it is often convenient to be able to show the relation of two targets. This can be computed and shown as a digital display. Other digital displays are also of importance in the use of training equipment of this type. For example, if a student is being trained in ship avoidance tactics, it is necessary for him to know his speed and course at any time. For this reason, the student radar display is provided wtih a control panel which includes means for modifying the simulated ship speed and rudder position and digital displays for showing the heading and speed of the ship. Similar digital display devices are provided for the instructor. This information is available from the computer, but it must be handled in the interface differently from the radar target information. Thus, for this information, separate storage registers are provided. Periodically the digital display information is updated in the computer and is applied to the storage register in the interface where it is retained for display. The digital information is applied to the separate displays and received from the separate information input switches in a prescribed sequence to provide the computer with identification of the information. An address counter is provided in the interface, and the outputs from the address counter energize separate, individual gating lines in sequence. As a line is energized, the information contained in a register or portion of a register is transmitted to the proper display. Or, as a line is energized, a pulse is applied to a particular switch to read the information stored in the switch by the settings of its contacts. This information is then applied to the computer to modify speeds, directions, etc. The timing of the reading and writing of the digital display information is accomplished under the control of the computer and the clock in the interface. The control lines in the computer output bus are individually energized when an operation is to take place in the interface, and this signal, combined with clock pulses to ensure proper timing, open and close gating circuits in the interface to cause the desired operation to take place. Often, an operation requires the simultaneous occurrence of several things. In those cases, multi-input gates are used to ensure no activity until all of the initial conditions have been satisfied.

This specification has described a new and improved training system for simulating operational systems such as radar, sonar, and the like. This system utilizes digital computer capabilities to provide a versatile and realistic system. It is realized that the reading of the above description may indicate to others skilled in the art ways in which the principles of this invention may be used without departing from its spirit. It is therefore, intended that this invention be limited only by the scope of the appended claims.

What is claimed is:

1. A trainer for simulating the operation of radar systems and the like, said trainer comprising a digital computer for generating digital information representative of the information to be displayed, a display device, means for converting the information to be displayed from digital form into the form used by the display device, said computer including at least a storage device in which information defining permanent portions of the display are stored in digital form, said storage device containing information defining substantially more of the information than is displayed at any time, computation means for performing computations on the information stored in said memory to change the portions of the stored information which are displayed at any time, an interface which receives the digital information from the computer, converts the received information into the proper order and sequence for use in the display device, and translates the received digital information into the form used by the display device, said interface comprising a clock for generating timing signals to assure synchronism of operation, said clock comprising a free-running oscillator, and a binary counter chain connected to receive at its input the output from said oscillator, said counter chain including a plurality of output terminals from which signals having the desired timing and frequency are derived.

2. The trainer defined in claim 1 wherein said interface further includes a first digital decoder and a temporary storage register, means for connecting the outputs from said temporary storage register to said first decoding means, means for connecting the inputs of said temporary storage register to the output from the computer so that digital information from said computer is temporarily stored in said temporary storage register while it is being decoded by said first decoder.

3. The trainer defined in claim 2 further comprising first insertion means for inserting initial operating conditions as computation parameters into said system for use by said computer, second insertion means for inserting into said system information defining items to be displayed in addition to the display information originally stored in said computer storage device, and digital display means for selectively displaying in digital form numerical information pertaining to said inserted information.

4. The trainer defined in claim 3 wherein said interface further includes means for scanning said first and second insertion means and said digital display means in a prescribed sequence to supply said computer with the additional information and to recover from said computer digital display information without confusion with the display information, said scanning means including a counter and a second counter decoder, said second decoder including a plurality of separate output terminals, a plurality of gates connected between said computer and said first and second insertion means and said digital displays, means connecting the individual terminals with the individual gates so that as said counter is stepped through its count, said gates are individually opened in sequence, and means for applying output pulses from said clock to said counter.

5. The trainer defined in claim 4 wherein said display device comprises a cathode ray tube and wherein said information displayed thereon comprises simulated radar returns, said digital information originally stored in said storage device defining a particular geographic area when converted by said conversion means into video information capable of controlling said cathode ray tube, said trainer further including antenna simulating means, said cathode ray tube display device including magnetic deflection yokes for developing beam deflecting forces to cause the cathode ray to sweep radially, and means for rotating said yokes to cause said radial sweeps to rotate, said antenna simulator including means for generating synchronizing signals for said yoke rotating means, and also including means for generating zeroing signals for said yoke rotating means and for said computer.

6. The trainer defined in claim 5 wherein the digital information stored in said storage device which defines a particular geographical area represents target returns by a series of pulses including a gating pulse and a plurality of intensity pulses, said conversion means in said interface including a gating circuit for controlling the application of the intensity pulses to said temporary storage register, means for applying said gating pulse to said gating circuit to open said gating circuit and cause the transfer of the intensity information to said temporary storage register, said first decoding means comprising a plurality of gates each having several input terminals, means for connecting said gate input terminals to individual outputs from said temporary storage register so that for each combination of pulses in said register a different combination of gates is opened, a resistor potential adder, and means to apply the outputs from said gates to said adder wherein they are added to produce a unique output potential for each combination of open gates.

7. The trainer defined in claim 6 wherein each radial sweep is represented by a train of pulse positions defining a plurality of target return positions, each of said target return positions being defined by said plurality of pulse positions of which said gating pulse is the leading pulse, means for improving the location resolution of said target presentation, said resolution improvement means comprising a plurality of bistable devices, one of said bistable devices being provided for each pulse position required to identify a target return, said bistable devices being arranged in shifting relation with said last filled bistable device containing said gating pulse, and means for connecting the outputs of said bistable devices to the inputs of said gating circuits.

8. A trainer for simulating radar including the dynamic simulation of land mass and targets, said trainer comprising a simulated radar receiver, a general purpose digital computer which includes at least a memory, a data processor, and a control unit; said memory containing digital information representing a particular area including both fixed and moveable features, each bit of said area-representing information having a predetermined positional relationship with a datum point; means for selectively storing in said memory digital information representing temporary radar targets having selectively predetermined initial positions with respect to said datum point; means for selectively supplying to said computer information representing the initial position of the simulated radar receiver and information representing the characteristics of any movement associated with said radar receiver; said computer automatically selecting the information from its memory which is to be displayed and performing the necessary computations for modifying the information to be displayed as the simulated movement of the radar receiver proceeds; said radar receiver including a radar display unit including appropriate power supplies and sweep circuits; and means connected to said computer and to said display unit for converting the digital information output from said computer into the appropriate form for display on said display unit and for synchronizing the information output from said computer with the display unit sweep circuit operation.

9. The trainer defined in claim 8 wherein said conversion unit includes means for receiving digital information from said computer in computer form and arrangement and for modifying the arrangement to meet the requirements of said display unit, said conversion unit further including register means for temporarily storing a prescribed number of bits of said rearranged information, means for detecting a prescribed condition in at least one of said bit locations, an information decoder, means responsive to the detection of said prescribed condition to transfer the remainder of said bits from said register to said decoder, and means for converting the output from said decoder into control potentials for said radar unit to determine the brightness with which a target return is displayed by said radar unit.

10. The trainer defined in claim 9 wherein said conversion unit comprises a clock for generating timing signals to insure the synchronism of operation of said computer and said radar receiver, said clock comprising a high frequency free-running oscillator, a binary counter chain connected to receive at its input the output from said oscillator, and means for receiving outputs from said counter chain at various points to provide synchonized signals of selected frequencies.

11. The trainer defined in claim 8 further including means for selectively applying to said computer information representing simulated changed heading and speed conditions of said radar receiver, said computer recalculating the relationship between the information stored in said memory pertaining to said area and the simulated radar receiver to provide new information to said conversion means indicative of the area into which said receiver is proceeding to simulate on said radar unit movement of said radar receiver through said area in the selected direction.

12. The trainer defined in claim 8 further including means for selectively applying to said computer information representative of the initial conditions of position, heading and speed of moving targets; said computer receiving said selectively provided information and providing said conversion means with computer outputs which are representative of the radar returns from said moving target as it proceeds through said displayed area in the direction and at the speed specified.

References Cited

UNITED STATES PATENTS

| | | | |
|---|---|---|---|
| 2,961,655 | 11/1960 | Magnuson | 35—10.4 X |
| 3,251,922 | 5/1966 | Franklin | 35—10.4 |
| 3,363,045 | 1/1968 | Pommerening | 35—10.4 |
| 3,374,481 | 3/1968 | Lupinetti | 35—10.4 X |
| 3,446,903 | 5/1969 | Beizer | 35—10.4 |

RODNEY D. BENNETT, Primary Examiner

T. H. TUBBESING, Assistant Examiner

U.S. Cl. X.R.

343—17.7